United States Patent
Wada et al.

(10) Patent No.: US 7,113,472 B2
(45) Date of Patent: Sep. 26, 2006

(54) OPTICAL HEAD INCLUDING AN ACTIVE POLYMER FILM FOR SWITCHING VOLTAGE DURING RECORDING AND REPRODUCING PROCESSES

(75) Inventors: Hidenori Wada, Uji (JP); Seiji Nishino, Osaka (JP); Shin-ichi Kadowaki, Sanda (JP); Hiroaki Yamamoto, Kawabe-gun (JP); Daisuke Ogata, Amagasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 609 days.

(21) Appl. No.: 10/096,674

(22) Filed: Mar. 12, 2002

(65) Prior Publication Data

US 2002/0141321 A1    Oct. 3, 2002

(30) Foreign Application Priority Data

Mar. 28, 2001  (JP) ............................. 2001-092486
May 29, 2001  (JP) ............................. 2001-160288

(51) Int. Cl.
*G11B 7/00*    (2006.01)

(52) U.S. Cl. .............................. 369/112.18; 369/112.16
(58) Field of Classification Search ............. 369/44.23, 369/44.24, 44.32, 44.39, 53.44, 112.01, 112.02, 369/112.03, 112.05, 112.06, 112.16, 112.18
See application file for complete search history.

(56) References Cited

U.S. PATENT DOCUMENTS

| | | | |
|---|---|---|---|
| 4,983,318 A * | 1/1991 | Matsumoto et al. ... | 252/299.01 |
| 5,930,219 A * | 7/1999 | Kim ....................... | 369/112.02 |
| 6,167,019 A * | 12/2000 | Tsuchiya et al. ....... | 369/112.18 |
| 6,580,674 B1 * | 6/2003 | Nishiyama et al. .... | 369/112.01 |
| 6,618,344 B1 * | 9/2003 | Funato ................... | 369/112.15 |
| 6,804,185 B1 * | 10/2004 | Kikuchi et al. ......... | 369/112.02 |

FOREIGN PATENT DOCUMENTS

| | | |
|---|---|---|
| EP | 0253 403 | 1/1988 |
| EP | 0 565 381 | 10/1993 |
| JP | 63-26604 | 2/1988 |
| JP | 6-27322 | 2/1994 |
| JP | 9-266918 | 10/1997 |
| JP | 2000-195086 | 7/2000 |

OTHER PUBLICATIONS

Jul. 2000, Yoshihiro Tajitsu "Huge Optical rotatory power and light modulation by biodegradatic polylactic acid film" Functional Materials, vol. 20, No. 7, Jul. 2000, pp. 5-11, and its partial English translation.

* cited by examiner

Primary Examiner—Tan Dinh
(74) Attorney, Agent, or Firm—Hamre, Schumann, Mueller & Larson, P.C.

(57) ABSTRACT

An optical head for recording or reproducing a signal with respect to an optical recording medium, which includes an optical element disposed between a light source and an optical recording medium. The optical element has an optically active polymer film in which an optical rotation property changes with respect to an applied voltage, a pair of conductive transparent thin films for applying a voltage to the optically active polymer film, and a transmittance polarization anisotropic part having a different transmittance with respect to a polarization direction, which is disposed on one of the conductive transparent thin films. By changing the applied voltage to the optically active polymer film, a light quantity of a linearly polarized light transmitted through the optical element can be changed substantially instantaneously. Therefore, the power of light reaching the optical recording medium can be switched substantially instantaneously at the time when switched between recording and reproduction.

31 Claims, 14 Drawing Sheets

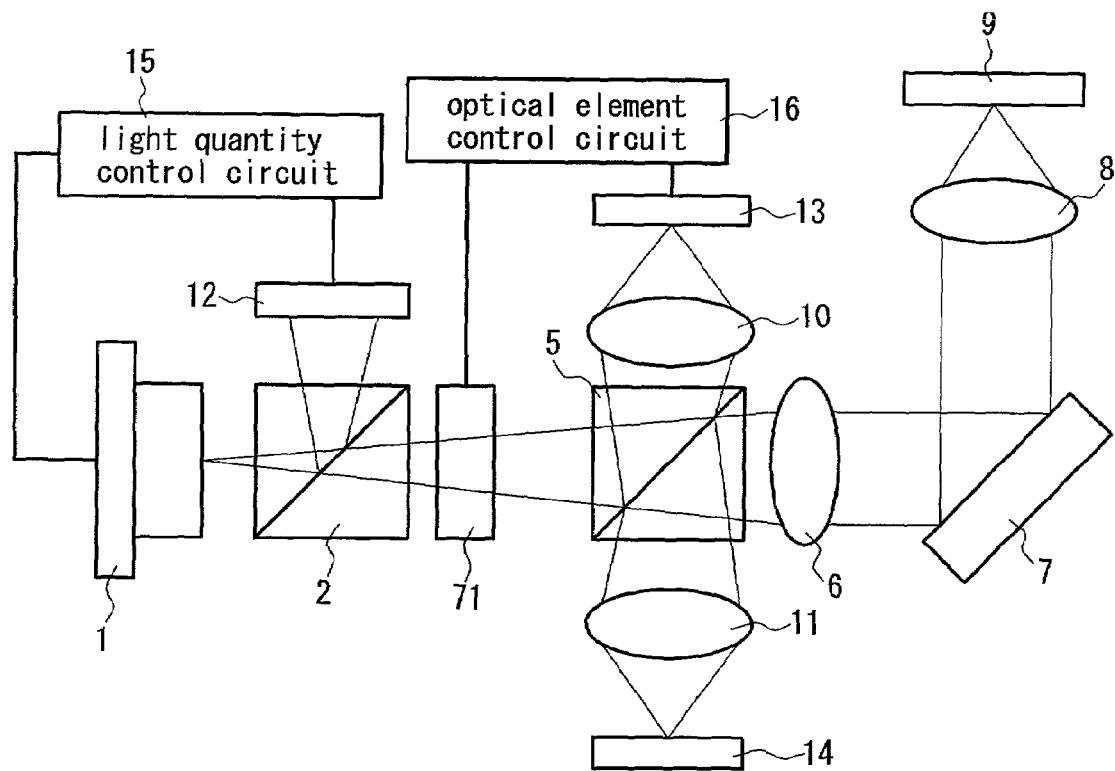
F I G. 7
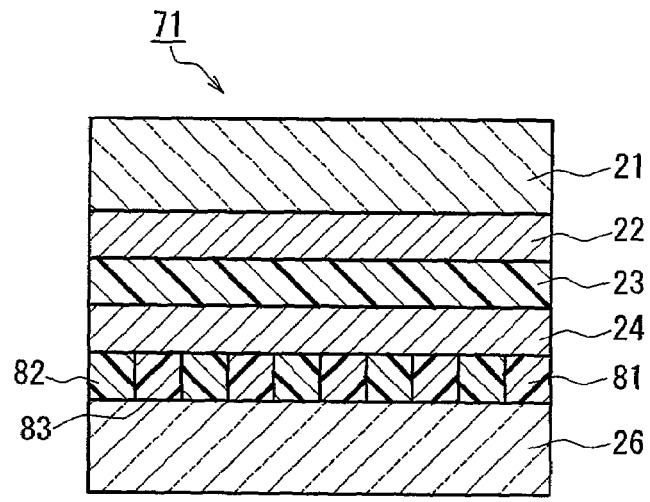
F I G. 8

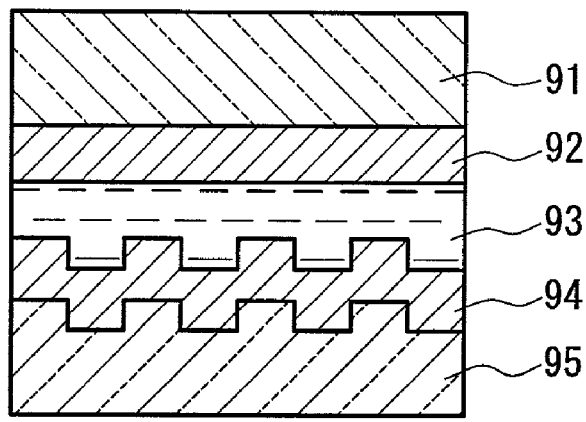
F I G. 9
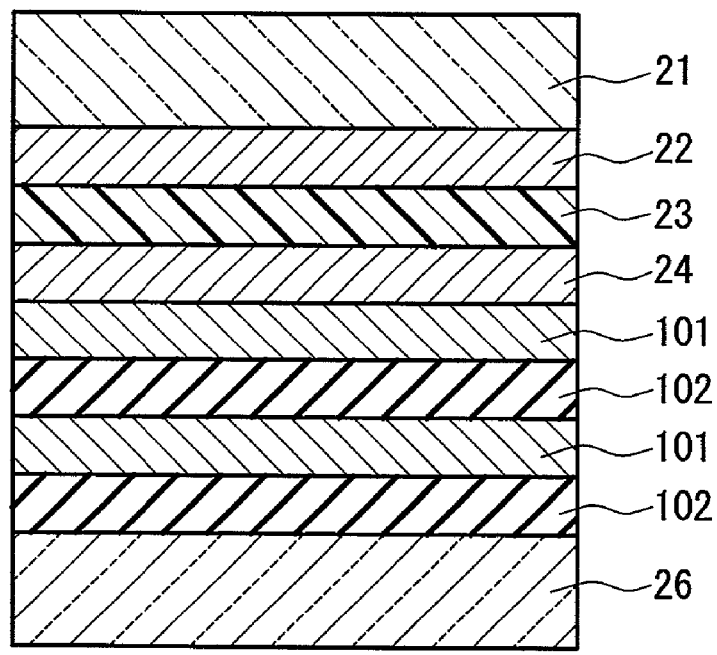
F I G. 10

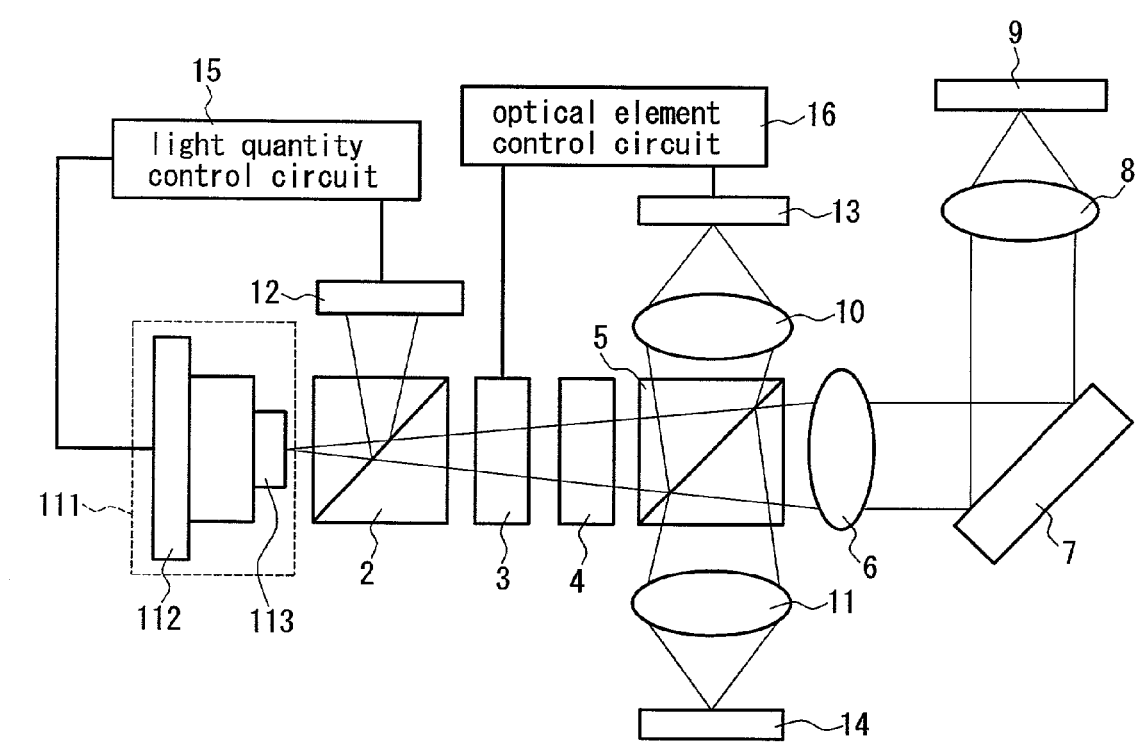
F I G. 1 1

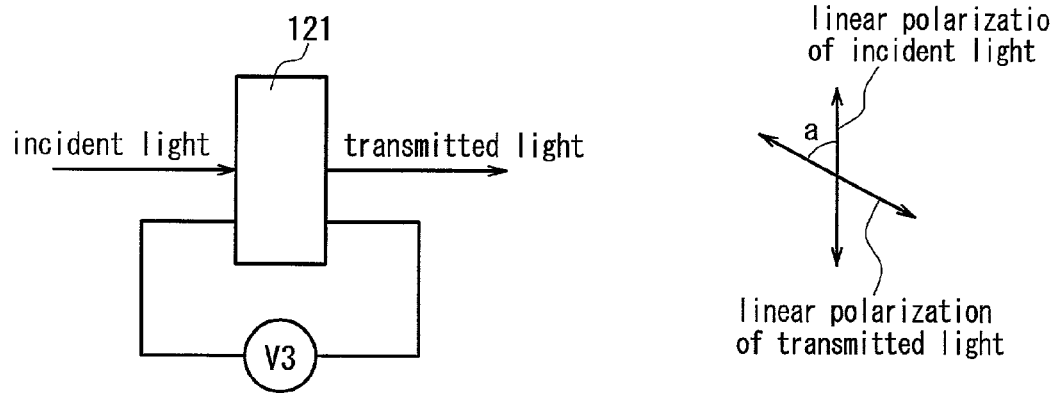
F I G. 1 3 A
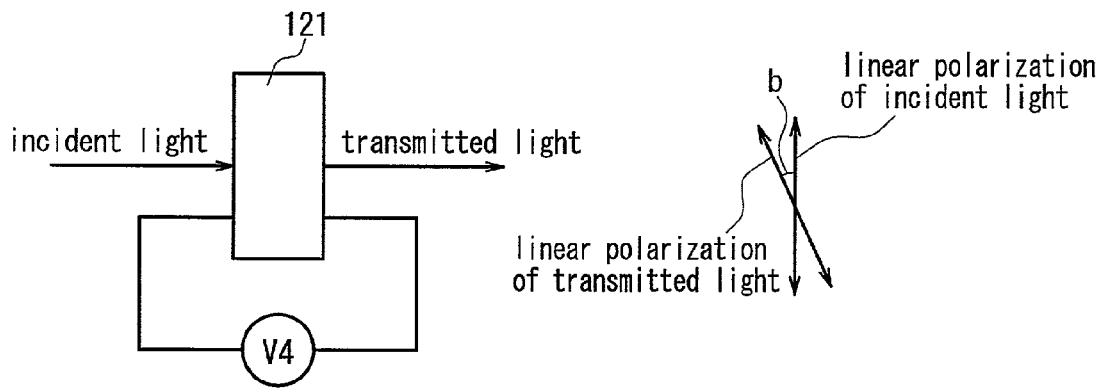
F I G. 1 3 B
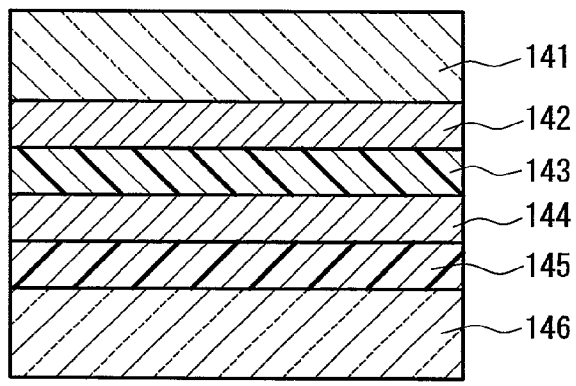
F I G. 1 4

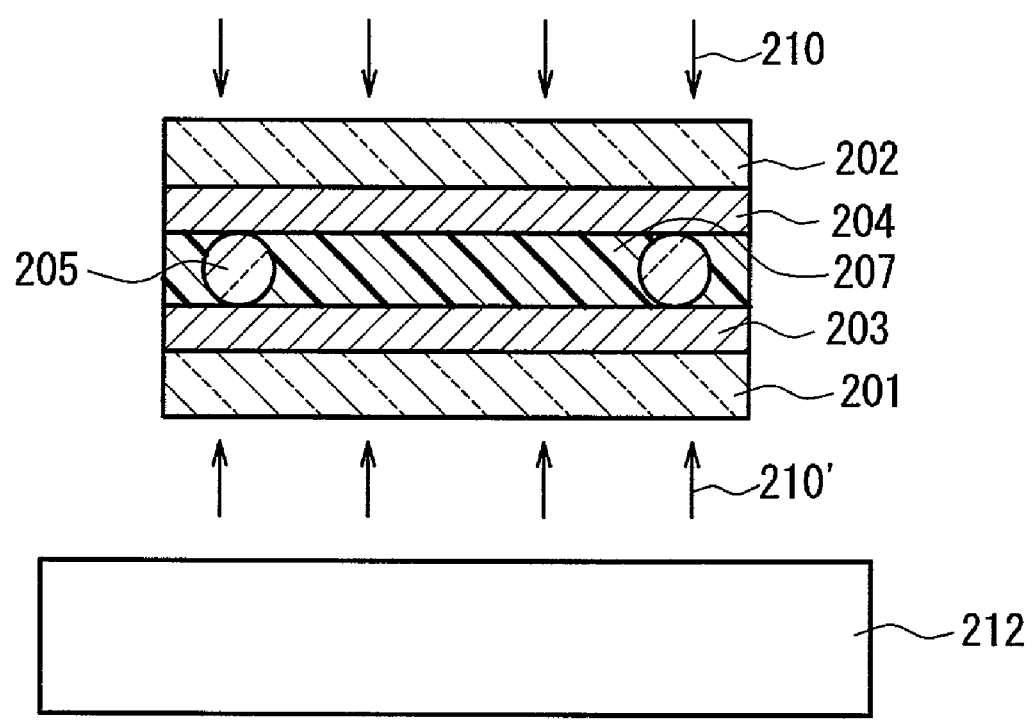
F I G. 1 8

OPTICAL HEAD INCLUDING AN ACTIVE POLYMER FILM FOR SWITCHING VOLTAGE DURING RECORDING AND REPRODUCING PROCESSES

FIELD OF THE INVENTION

The present invention relates to an optical element, an optical head and an optical recording reproduction device used for optical information processing or optical communication and the like. Furthermore, the present invention relates to a method for manufacturing an optically active polymer film.

BACKGROUND OF THE INVENTION

In recent years, due to the fact that a digital versatile disc (DVD) can record digital information with a recording density about 6 times higher than a compact disc (CD), the DVD is drawing attention as an optical recording medium having a large capacity. However, along with the development of information to have a larger capacity, a high-density optical recording medium has been desired. Here, in order to achieve higher density than the DVD (wavelength 660 nm, numerical aperture (NA) 0.6), it is necessary to shorten the wavelength of a light source and to enlarge the NA of an objective lens. For example, when using a blue laser of 405 nm and an objective lens of NA 0.85, a recording density 5 times higher than that of the DVD can be achieved.

However, a high-density optical disc device using the above-mentioned blue laser has an extremely strict reproduction margin, so that quantum noise of the light source becomes a problem. Therefore, JP2000-195086A proposes an optical head that can suppress the quantum noise of a semiconductor laser to a low level and perform excellent reproduction with low noise while suppressing the power on the surface of an optical disc to a low level, thus preventing the optical disc from deteriorating or the data from being deleted and so forth.

Here, one example of the above-mentioned conventional optical head will be described with reference to the drawing.

FIG. 20 is a schematic view showing the configuration of a conventional optical head disclosed in JP2000-195086A.

In this drawing, 161 is a light source, 162 is an intensity filter, 163 is a beam splitter, 164 is a collimator lens, 165 is a mirror, 166 is an objective lens, 167 is an optical disc, 168 is a multilens, and 169 is a photodiode.

The light source 161 is a GaN-type blue luminous semiconductor laser, which is a light source emitting a coherent light for recording and reproduction to a recording layer of the optical disc 167. The intensity filter 162 is an element on which an absorption film is formed and is arranged to be inserted into and taken out from an optical path. The beam splitter 163 is an optical element for splitting light; the collimator lens 164 is a lens that converts a divergent light emitted from the light source 161 into a parallel light; the mirror 165 is an optical element for reflecting an incident light and directing it in the direction of the optical disc 167; the objective lens 166 is a lens that focuses light on the recording layer of the optical disc 167; the multilens 168 is a lens that focuses light on the photodiode 169; and the photodiode 169 receives light reflected by the recording layer of the optical disc and converts the light into an electric signal.

The operation of the optical head having the aforementioned structure will be explained. Here, the intensity filter 162 is inserted into the optical path at the time of reproduction and taken out from the optical path at the time of recording. With respect to the light emitted from the light source 161, the light quantity is attenuated by passing through the intensity filter 162 at the time of reproduction, while the light quantity is not attenuated at the time of recording since the intensity filter 162 is taken out from the optical path. Next, the light transmitted through the intensity filter 162 (the light emitted from the light source at the time of recording) is reflected by the beam splitter 163 and converted into a parallel light by the collimator lens 164. The light converted into the parallel light is reflected by the mirror 165 and focused on the optical disc 167 by the objective lens 166. Next, the light reflected from the optical disc 167 is transmitted through the objective lens 166, reflected by the mirror 165, transmitted through the collimator lens 164, transmitted through the beam splitter 163 and focused on the photodiode 169 by the multilens 168. Using the astigmatism method, the photodiode 169 outputs a focus error signal showing the focused state of the light on the optical disc 167 or a tracking error signal showing the irradiated position of the light.

Based on the focus error signal, focus control means not shown in the drawing controls the position of the objective lens 166 in its optical axial direction so that the light is collected constantly on the optical disc 167 in the focused state.

Furthermore, based on the tracking error signal, tracking control means not shown in the drawing controls the radial position of the objective lens 166 so that the light is focused on a desired track on the optical disc 167.

In addition, the photodetector 169 reproduces information recorded in the optical disc 167.

According to this configuration, it is possible to perform reproduction by suppressing the power on the surface to a low level that is incapable of causing deterioration of the optical disc or deletion of the data, while setting the power of the light source to a power with sufficiently low quantum noise, and to perform recording by using the power of the light source as it is.

However, in the optical head having the aforementioned structure, the intensity filter 162 needs to be inserted and taken out at the time of switching between recording and reproduction, and in the case where recording needs to be performed instantaneously after an address reproduction, the speed of inserting and taking out the intensity filter 162 becomes a problem. For example, the next generation high-density optical disc with a higher density than the DVD requires a switching time of about 100 n seconds, but such a speed is extremely difficult to be achieved by inserting and taking out in a mechanical manner.

Furthermore, in order to insert and take out the intensity filter 162, a system (mechanism) for implementing this operation is necessary, and thus, the optical head tends to become larger in size, so that this configuration is not suitable for miniaturization of the optical head.

SUMMARY OF THE INVENTION

In view of the foregoing conventional problems, it is an object of the present invention to provide an optical element capable of conducting an instantaneous switching between recording and reproduction.

Furthermore, it is an object of the present invention to provide an optical head which, with the use of this optical element, can conduct reproduction by suppressing the power on the surface to a low power that is incapable of causing deterioration of an optical disc or deletion of data, while setting the power of a light source to a power with sufficiently low quantum noise and can conduct recording by using the power of the light source as it is at the time of recording, and also which is capable of conducting an instantaneous switching between recording and reproduction and suitable for miniaturization.

Furthermore, it is an object of the present invention to provide an optical recording reproduction device that can conduct an instantaneous switching between recording and reproduction and is suitable for miniaturization and high-density recording.

In addition, it is an object of the present invention to provide a method for manufacturing an optically active polymer film that can be used to form the aforementioned optical element of the present invention. Furthermore, it is an object of the present invention to provide a method for manufacturing an optically active polymer film that can be mass-produced easily.

To achieve the aforementioned objects, the present invention includes the following configurations:

An optical element of the present invention includes an optically active polymer film in which an optical rotation property changes in accordance with an outside voltage to be applied, conductive transparent thin films disposed on both sides of the optically active polymer film for applying a voltage to the optically active polymer film, and a transmittance polarization anisotropic part having a different transmittance with respect to a polarization direction, the transmittance polarization anisotropic part being disposed on a side opposite to the optically active polymer film on one of the conductive transparent thin films. According to this configuration, the polarization direction of a linearly polarized light after being transmitted through the optically active polymer film is changed in accordance with the outside voltage to be applied, and the light quantity to be transmitted is changed by the transmittance polarization anisotropic part, so that the light quantity to be transmitted can be switched at high speed.

Furthermore, an optical element of the present invention includes an optically active polymer film in which an optical rotation property changes in accordance with an outside voltage to be applied, conductive transparent thin films disposed on both sides of the optically active polymer film for applying a voltage to the optically active polymer film, and an optically active polymer film thickness correction part for correcting an optical rotation property arising from an error in film thickness of the optically active polymer film, the optically active polymer film thickness correction part being disposed on a side opposite to the optically active polymer film on one of the conductive transparent thin films. According to this configuration, the polarization direction of an incident light can be changed at high speed in accordance with the outside voltage to be applied. In addition, with the optically active polymer film thickness correction part, a linearly polarized light having a desired polarization direction can be obtained by applying no external voltage or by making a short circuit.

In addition, an optical element of the present invention includes an optically active polymer film in which an optical rotation property changes in accordance with an outside voltage to be applied, conductive transparent thin films disposed on both sides of the optically active polymer film for applying a voltage to the optically active polymer film, an optically active polymer film thickness correction part for correcting an optical rotation property arising from an error in film thickness of the optically active polymer film, the optically active polymer film thickness correction part being disposed on a side opposite to the optically active polymer film on one of the conductive transparent thin films, and a transmittance polarization anisotropic part having a different transmittance with respect to a polarization direction, the transmittance polarization anisotropic part being disposed on a side opposite to the conductive transparent thin film of the optically active polymer film thickness correction part. According to this configuration, the polarization direction of a linearly polarized light after being transmitted through the optically active polymer film is changed in accordance with the outside voltage to be applied, and the light quantity to be transmitted is changed by the transmittance polarization anisotropic part, so that the light quantity to be transmitted can be switched at high speed. Moreover, with the optically active polymer film thickness correction part, a desired transmittance can be obtained by applying no external voltage or by making a short circuit.

In the above-mentioned optical element of the present invention, it is preferable that the optically active polymer film includes a polylactic acid film. According to this configuration, a response characteristic with respect to an external voltage speeds up greatly.

In the above-mentioned optical element of the present invention, it is preferable that a change in transmittance of the transmittance polarization anisotropic part occurs by a change in absorptance occurring in accordance with a polarization direction. According to this configuration, the transmittance polarization anisotropic part can be realized.

In the above-mentioned optical element of the present invention, it is preferable that the transmittance polarization anisotropic part includes an analyzer film. According to this configuration, it becomes possible to perform wafer processing, and an optical element having excellent mass-production characteristics can be obtained.

In the above-mentioned optical element of the present invention, it is preferable that a change in transmittance of the transmittance polarization anisotropic part occurs by a change in diffraction efficiency occurring in accordance with a polarization direction. According to this configuration, the transmittance polarization anisotropic part can be achieved.

In the above-mentioned optical element of the present invention, it is preferable that the transmittance polarization anisotropic part includes a polarizing hologram. According to this configuration, it becomes possible to perform wafer processing, and an optical element having excellent mass-production characteristics can be obtained.

In the above-mentioned optical element of the present invention, it is preferable that a change in transmittance of the transmittance polarization anisotropic part occurs by a change in reflectance occurring in accordance with a polarization direction. According to this configuration, the transmittance polarization anisotropic part can be achieved.

In the above-mentioned optical element of the present invention, it is preferable that the transmittance polarization anisotropic part has a multilayer film including a birefringent film. According to this configuration, it becomes possible to perform wafer processing, and an optical element having excellent mass-production characteristics can be obtained.

In the above-mentioned optical element of the present invention, it is preferable that the optically active polymer film thickness correction part includes a K/2 wave plate (K is an odd number of 1 and above). According to this configuration, the optically active polymer film thickness correction part can be achieved.

In the above-mentioned optical element of the present invention, it is preferable that the optically active polymer film is formed into a multilayer structure. According to this configuration, the voltage to be applied from the outside needed for achieving the desired characteristics is reduced.

Next, an optical head of the present invention is an optical head for recording or reproducing a signal with respect to an optical recording medium, and the optical head includes a light source and the above-mentioned optical element of the present invention disposed between the light source and the optical recording medium, wherein a voltage to be applied to the optical element is switched at the time of recording and at the time of reproduction. According to this configuration, when reproduction is performed, the power on the surface can be suppressed for reproduction to a low level that is incapable of causing deterioration of an optical disc or deletion of data by reducing the transmittance of the optical element, while setting the power of the light source to a power with sufficiently low quantum noise, and when recording is performed, the power of the light source can be used as it is for recording by raising the transmittance of the optical element. In addition, the transmittance of the optical element can be switched at high speed by an electric signal from the outside, so that it becomes possible to switch between recording and reproduction instantaneously. Furthermore, a mechanism for inserting and taking out an intensity filter as in the conventional example is no longer necessary, so that the optical head is suited for miniaturization.

Moreover, when an optically active polymer film thickness correction part is provided, a desired transmittance can be obtained without applying an external voltage or by a short circuit, so that the stability of the optical head is improved.

Furthermore, an optical head of the present invention is an optical head for recording or reproducing a signal with respect to an optical recording medium, and the optical head includes a light source and the above-mentioned optical element of the present invention disposed between the light source and the optical recording medium, wherein a recording signal is formed by changing a voltage to be applied to the optical element. According to this configuration, even if it is difficult to modulate the light source for recording, it becomes possible to record information in the optical recording medium. Moreover, when the optically active polymer film thickness correction part is provided, a desired transmittance can be obtained by applying no external voltage or by making a short circuit, so that the stability of the optical head is improved.

Furthermore, an optical head of the present invention is an optical head for recording or reproducing a signal with respect to an optical recording medium, and the optical head includes a light source and the above-mentioned optical element of the present invention disposed between the light source and the optical recording medium, wherein a diffracted light generated in the optical element is used to detect a tracking error signal. According to this configuration, the diffracted light generated in the optical element can be used as a sub-beam needed for obtaining a tracking error signal, so that the optical element of the present invention also can serve as an optical element used for detecting a tracking error signal. Thus, the optical element is suited for miniaturization and cost reduction of the optical head.

Furthermore, an optical head of the present invention is an optical head for recording or reproducing a signal with respect to an optical recording medium, and the optical head includes a light source, the above-mentioned optical element of the present invention disposed between the light source and the optical recording medium, light quantity control means that receives light emitted from the light source and controls a light quantity of the light source, and optical element control means for controlling characteristics of the optical element. According to this configuration, the characteristics of the optical head do not change even if a change in temperature etc. occurs, so that the optical element is controlled perfectly.

Furthermore, an optical head of the present invention is an optical head for recording or reproducing a signal with respect to an optical recording medium, and the optical head includes a light source, the above-mentioned optical element of the present invention disposed between the light source and the optical recording medium, and polarization separation means disposed between the optical element and the optical recording medium, wherein a voltage to be applied to the optical element is switched at the time of recording and at the time of reproduction. According to this configuration, when reproduction is performed, the power on the surface can be suppressed for reproduction to a low level that is incapable of causing deterioration of an optical disc or deletion of data by reducing the transmittance of the optical element, while setting the power of the light source to a power with sufficiently low quantum noise, and when recording is performed, the power of the light source can be used as it is for recording by raising the transmittance of the optical element. In addition, the transmittance of the optical element can be switched at high speed by an electric signal from the outside, so that it becomes possible to switch between recording and reproduction instantaneously. Furthermore, a mechanism for inserting and taking out an intensity filter as in the conventional example is no longer necessary, so that the optical head is suited for miniaturization.

Moreover, when an optically active polymer film thickness correction part is provided, a desired transmittance can be obtained by applying no external voltage or by making a short circuit, so that the stability of the optical head is improved.

Furthermore, an optical head of the present invention is an optical head for recording or reproducing a signal with respect to an optical recording medium, and the optical head includes a light source, the above-mentioned optical element of the present invention disposed between the light source and the optical recording medium, and polarization separation means disposed between the optical element and the optical recording medium, wherein a recording signal is formed by changing a voltage to be applied to the optical element. According to this configuration, even if it is difficult to modulate the light source for recording, it becomes possible to record information in the optical recording medium. Moreover, when an optically active polymer film thickness correction part is provided, a linearly polarized light having a desired polarization direction can be obtained without applying an external voltage or by a short circuit, so that the stability of the optical head is improved.

Furthermore, an optical head of the present invention is an optical head for recording or reproducing a signal with respect to an optical recording medium, and the optical head includes a light source, the above-mentioned optical element of the present invention disposed between the light source and the optical recording medium, polarization separation means disposed between the optical element and the optical recording medium, light quantity control means that receives light emitted from the light source and controls a light quantity of the light source, and optical element control means for controlling characteristics of the optical element. According to this configuration, the characteristics of the optical head do not change even if a change in temperature etc. occurs, so that the optical element is controlled perfectly.

Furthermore, an optical head of the present invention is an optical head for recording or reproducing a signal with respect to an optical recording medium, and the optical head includes a light source, an optically active polymer film in which an optical rotation property changes in accordance with an outside voltage to be applied, the optically active polymer film being disposed between the light source and the optical recording medium, and polarization separation means disposed between the optically active polymer film and the optical recording medium, wherein a voltage to be applied to the optically active polymer film is switched at the time of recording and at the time of reproduction. According to this configuration, when reproduction is performed, the power on the surface can be suppressed for reproduction to a low level that is incapable of causing deterioration of an optical disc or deletion of data by reducing the transmittance of the optical element, while setting the power of the light source to a power with sufficiently low quantum noise, and when recording is performed, the power of the light source can be used as it is for recording by raising the transmittance of the optical element. In addition, the transmittance of the optical element can be switched at high speed by an electric signal from the outside, so that it becomes possible to switch between recording and reproduction instantaneously. Furthermore, a mechanism for inserting and taking out an intensity filter as in the conventional example is no longer necessary, so that the optical head is suited for miniaturization.

Furthermore, an optical head of the present invention is an optical head for recording or reproducing a signal with respect to an optical recording medium, and the optical head includes a light source, an optically active polymer film in which an optical rotation property changes in accordance with an outside voltage to be applied, the optically active polymer film being disposed between the light source and the optical recording medium, and polarization separation means disposed between the optically active polymer film and the optical recording medium, wherein a recording signal is formed by changing a voltage to be applied to the optically active polymer film. According to this configuration, even if it is difficult to modulate the light source for recording, it becomes possible to record information in the optical recording medium.

Furthermore, an optical head of the present invention is an optical head for recording or reproducing a signal with respect to an optical recording medium, and the optical head includes a light source, an optically active polymer film in which an optical rotation property changes in accordance with an outside voltage to be applied, the optically active polymer film being disposed between the light source and the optical recording medium, polarization separation means disposed between the optically active polymer film and the optical recording medium, light quantity control means that receives light emitted from the light source and controls a light quantity of the light source, and optical element control means for controlling characteristics of the optically active polymer film. According to this configuration, the characteristics of the optical head do not change even if a change in temperature etc. occurs, so that the optical element is controlled perfectly.

Furthermore, an optical head of the present invention is an optical head for recording or reproducing a signal with respect to an optical recording medium, and the optical head includes a light source, an optically active polymer film in which an optical rotation property changes in accordance with an outside voltage to be applied, the optically active polymer film being disposed between the light source and the optical recording medium, an optically active polymer film thickness correction part for correcting an optical rotation property arising from an error in film thickness of the optically active polymer film, the optically active polymer film thickness correction part being disposed between the optically active polymer film and the optical recording medium, and polarization separation means disposed between the optically active polymer film thickness correction part and the optical recording medium, wherein a voltage to be applied to the optically active polymer film is switched at the time of recording and at the time of reproduction. According to this configuration, when reproduction is performed, the power on the surface can be suppressed for reproduction to a low power that is incapable of causing deterioration of an optical disc or deletion of data by reducing the transmittance of the optical element, while setting the power of the light source to a power with sufficiently low quantum noise, and when recording is performed, the power of the light source can be used as it is for recording by raising the transmittance of the optical element. In addition, the transmittance of the optical element can be switched at high speed by an electric signal from the outside, so that it becomes possible to switch between recording and reproduction instantaneously. Furthermore, a mechanism for inserting and taking out an intensity filter as in the conventional example is no longer necessary, so that the optical head is suited for miniaturization.

Moreover, with the optically active polymer film thickness correction part, a desired transmittance can be obtained by applying no external voltage or by making a short circuit, so that the stability of the optical head is improved.

Furthermore, an optical head of the present invention is an optical head for recording or reproducing a signal with respect to an optical recording medium, and the optical head includes a light source, an optically active polymer film in which an optical rotation property changes in accordance with an outside voltage to be applied, the optically active polymer film being disposed between the light source and the optical recording medium, an optically active polymer film thickness correction part for correcting an optical rotation property arising from an error in film thickness of the optically active polymer film, the optically active polymer film thickness correction part being disposed between the optically active polymer film and the optical recording medium, and polarization separation means disposed between the optically active polymer film thickness correction part and the optical recording medium, wherein a recording signal is formed by changing a voltage to be applied to the optically active polymer film. According to this configuration, even if the light source is difficult to be modulated for recording, it becomes possible to record information in the optical recording medium. Moreover, with the optically active polymer film thickness correction part, a linearly polarized light having a desired polarization direction can be obtained by applying no external voltage or by making a short circuit, so that the stability of the optical head is improved.

Furthermore, an optical head of the present invention is an optical head for recording or reproducing a signal with respect to an optical recording medium, and the optical head includes a light source, an optically active polymer film in which an optical rotation property changes in accordance with an outside voltage to be applied, the optically active polymer film being disposed between the light source and the optical recording medium, an optically active polymer film thickness correction part for correcting an optical rotation property arising from an error in film thickness of the optically active polymer film, the optically active polymer film thickness correction part being disposed between the optically active polymer film and the optical recording medium, polarization separation means disposed between the optically active polymer film thickness correction part and the optical recording medium, light quantity control means that receives light emitted from the light source and controls a light quantity of the light source, and optical element control means for controlling characteristics of the optically active polymer film. According to this configuration, the optically active polymer film is controlled perfectly.

Next, an optical recording reproduction device of the present invention is an optical recording reproduction device for recording or reproducing a signal with respect to an optical recording medium, and the optical recording reproduction device includes an optical head for recording or reproducing a signal with respect to the optical recording medium, wherein the optical head is the above-mentioned optical head of the present invention. According to this configuration, when reproduction is performed, the power on the surface can be suppressed for reproduction to a low power that is incapable of causing deterioration of an optical disc or deletion of data, while setting the power of the light source to a power with sufficiently low quantum noise, and when recording is performed, the power of the light source can be used as it is for recording. In addition, the transmittance of the optical element can be switched at high speed by an electric signal from the outside, so that it becomes possible to switch between recording and reproduction instantaneously. Furthermore, a mechanism for inserting and taking out an intensity filter as in the conventional example is no longer necessary, so that the optical head is suited for miniaturization.

Moreover, when an optically active polymer film thickness correction part is provided, a desired transmittance can be obtained by applying no external voltage or by making a short circuit, so that the stability of the optical head is improved.

Next, a method for manufacturing an optically active polymer film of the present invention is a method including: disposing a first substrate having a conductive transparent thin film and a second substrate having a conductive transparent thin film such that the conductive transparent thin films face each other and a desired space is created between the two conductive transparent thin films, disposing a polymer, which is capable of optical activity, in a molten state between the two conductive transparent thin films, and cooling it while maintaining an oriented direction of molecules included in the polymer in a desired direction. According to this method, an optically active polymer film having excellent orientation can be manufactured, and it becomes possible to manufacture an optically active polymer film having a great change in optical rotation property in a shorter time in accordance with an applied voltage.

In addition, when this optically active polymer film is used to construct an optical head or an optical recording reproduction device, switching between recording and reproduction can be preformed in a shorter time.

In the above-mentioned manufacturing method, it is preferable that the polymer in the molten state is formed by disposing the polymer in a solid state between the two conductive transparent thin films and heating it at least to a melting point of the polymer. According to this method, it is easy to dispose an optically active polymer of a desired weight between the substrates.

In the above-mentioned manufacturing method, it is preferable that the oriented direction of the molecules is maintained in the desired direction by applying an electric field to the polymer in the molten state. According to this method, the oriented direction of the polymer can be maintained easily in the desired direction.

In the above-mentioned manufacturing method, it is preferable that the oriented direction of the molecules is maintained in the desired direction by applying standing ultrasonic waves to the polymer in the molten state. According to this method, the oriented direction of the polymer can be maintained easily in the desired direction.

In the above-mentioned manufacturing method, it is preferable that the standing waves of the ultrasonic waves are formed as a result of an interference between the ultrasonic waves caused by applying ultrasonic waves from different directions. According to this method, the phase or the volume of ultrasonic waves is controlled respectively for the ultrasonic waves to be applied, so that the standing waves applied to the polymer are controlled easily.

In the above-mentioned manufacturing method, it is preferable that the standing waves of the ultrasonic waves are formed as a result of an interference between the applied ultrasonic waves and reflected waves of the ultrasonic waves. According to this method, the circuit configuration for controlling the standing waves of the ultrasonic wave can be simplified.

To achieve the above-mentioned objects, a method for manufacturing an optically active polymer film of the present invention includes: disposing a first substrate having a conductive transparent thin film and a second substrate having a conductive transparent thin film such that the conductive transparent thin films face each other and a desired space is created between the two conductive transparent thin films, disposing a polymer, which is capable of optical activity, in a solid state between the two conductive transparent thin films, converging ultrasonic waves on a part of the polymer in the solid state, melting only the polymer in a position where the ultrasonic waves are converged, and shifting the position where the ultrasonic waves are converged over the course of time. According to this method, an optically active polymer film having excellent orientation can be manufactured, and it becomes possible to manufacture an optically active polymer film having a great change in optical rotation property in a shorter time in accordance with an applied voltage.

In addition, when this optically active polymer film is used to construct an optical head or an optical recording reproduction device, switching between recording and reproduction can be preformed in a shorter time.

In the above-mentioned manufacturing method, it is preferable that the polymer in the solid state is powder. As a result, it is easy to conduct a weight control of the polymer to be disposed.

In the above-mentioned manufacturing method, it is preferable that the polymer in the solid state is a film. As a result, it is easy to conduct a weight control of the polymer to be disposed. Moreover, according to this method of melting sequentially only the polymer in the position where the ultrasonic waves are converged, a part of the film is melted, thereby forming a polylactic film having excellent orientation, so that the thickness of the optically active polymer film having excellent orientation to be manufactured becomes equal to a thickness of this film. Therefore, a space of a desired size can be formed without using a separate member.

In the above-mentioned manufacturing method, it is preferable that the polymer is polylactic acid. As a result, switching of several n seconds becomes possible.

In the above-mentioned manufacturing method, it is preferable that the space is formed by disposing a member having a desired size between the first and second substrates. According to this method, the space of a desired size can be formed with excellent precision.

In the above-mentioned manufacturing method, it is preferable that the member is transparent. Thus, the incident light will not be lost.

In the above-mentioned manufacturing method, it is preferable that a refractive index of the member is substantially equal to a refractive index of the polymer. Thus, the incident light will not be lost.

In the above-mentioned manufacturing method, it is preferable that a glass transition point of the member is not less than a melting point of the polymer. As a result, the space of a desired size can be formed with even greater precision.

BRIEF DESCRIPTION OF THE DRAWINGS

FIG. 7 is a schematic view showing one example of an optical head according to Embodiment 2 of the present invention.

FIG. 8 is a cross-sectional view showing one example of an optical element according to Embodiment 2 of the present invention.

FIG. 9 is a cross-sectional view showing another example of an optical element according to Embodiment 2 of the present invention.

FIG. 10 is a cross-sectional view showing yet another example of an optical element of the present invention.

FIG. 11 is a schematic view showing one example of an optical head according to Embodiment 3 of the present invention.

FIG. 13A and FIG. 13B are diagrams for explaining a polarization direction of a linearly polarized light before and after transmission in the optical element according to Embodiment 4 of the present invention.

FIG. 14 is a cross-sectional view showing one example of an optical element according to Embodiment 4 of the present invention.

FIG. 18 is a diagram showing another example of a method for forming standing waves of ultrasonic waves in Embodiment 7 of the present invention.

DETAILED DESCRIPTION OF THE INVENTION

In the following, embodiments of the present invention will be described with reference to the drawings.

Embodiment 1

In Embodiment 1, one example of an optical head in the present invention will be explained.

Figure 1:
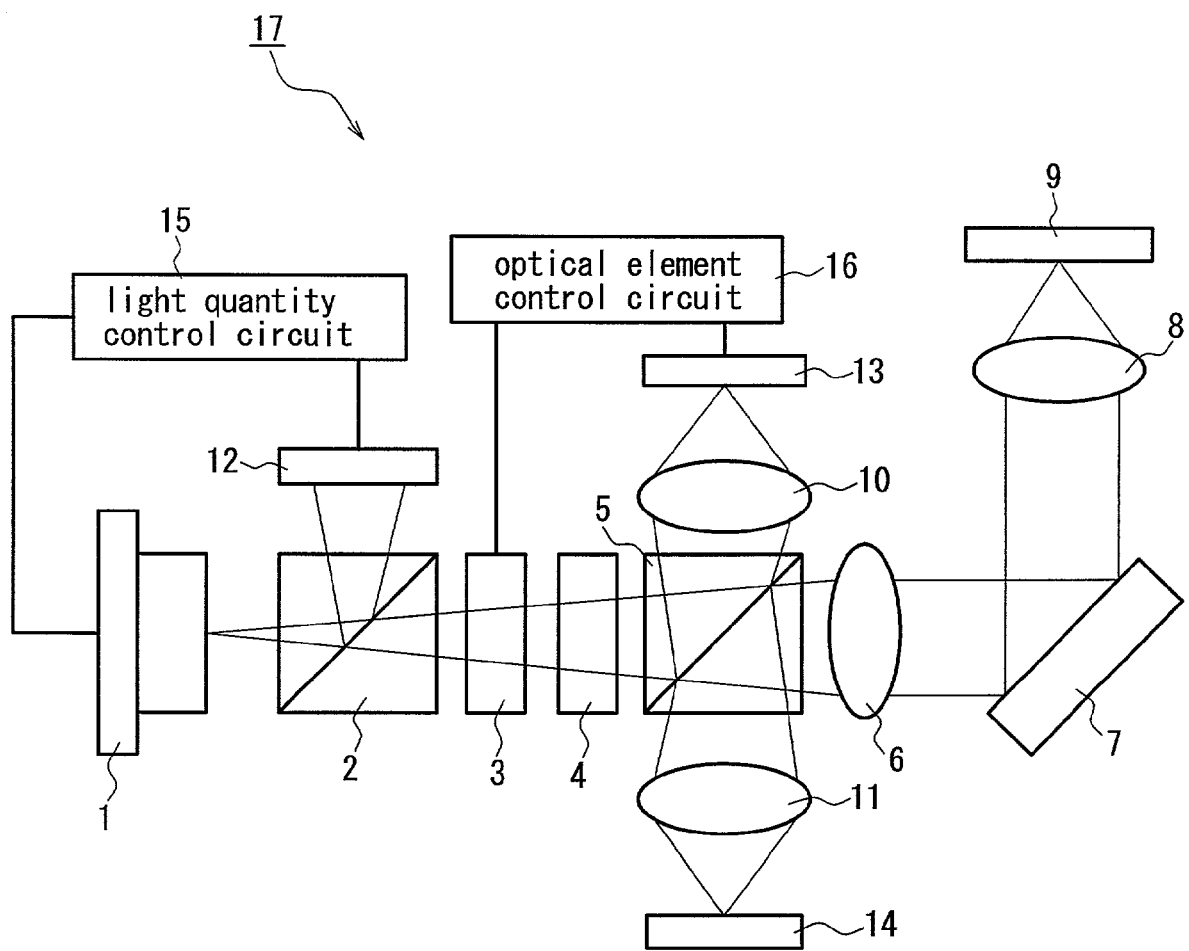
FIG. 1 is a schematic view showing one example of an optical head according to Embodiment 1 of the present invention.

FIG. 1 is a view showing the configuration of an optical head 17 in Embodiment 1. The optical head 17 of Embodiment 1 is an optical head including an optical element of the present invention.

In FIG. 1, 1 is a light source, 2 is a first beam splitter, 3 is an optical element of the present invention, 4 is a diffraction grating, 5 is a second beam splitter, 6 is a collimator lens, 7 is a mirror, 8 is an objective lens, 9 is an optical recording medium, 10 is a first collecting lens, 11 is a second collecting lens, 12 is a first photodetector, 13 is a second photodetector, 14 is a third photodetector, 15 is a light quantity control circuit, and 16 is an optical element control circuit. Here, the focal optical system includes the collimator lens 6 and the objective lens 8; the light quantity control means includes the first photodetector 12 and the light quantity control circuit 15; and the optical element control means includes the second photodetector 13 and the optical element control circuit 16.

Here, the light source 1 includes, for example, a GaN-type semiconductor laser (wavelength 405 nm), which is a light source emitting a coherent light for recording and reproduction to a recording layer of the optical recording medium 9. The first beam splitter 2 is an optical element having a transmittance of 90% and a reflectance of 10%. The optical element 3 of the present invention, which will be described later in detail, is an optical element in which the transmittance is changed in accordance with an external signal (that is, a control signal from the optical element control circuit 16). The diffraction grating 4 is a grating formed by patterning a desired pattern on a glass surface using photolithography and then etching the pattern and exhibits approximately 90% for the zero-order diffraction efficiency and approximately 10% for the i first-order diffraction efficiency. The second beam splitter 5 is an optical element having a transmittance of approximately 50% and a reflectance of approximately 50%. The collimator lens 6 is a lens that converts a divergent light emitted from the light source 1 into a parallel light. The mirror 7 is an optical element that reflects an incident light and directs it in the direction of the optical recording medium 9. The objective lens 8 is a lens that focuses light on the recording layer of the optical recording medium 9. The first collecting lens 10 is a lens that focuses a part of the light emitted from the light source 1 and transmitted through the optical element 3 of the present invention on the second photodetector 13. The second collecting lens 11 is a lens that focuses the light reflected by the photodetector 9 on the third photodetector 14. The first, second and third photodetectors 12, 13, 14 receive light and convert the light into an electric signal.

The operation of the optical head having the aforementioned structure will be explained with reference to FIG. 1. A linearly polarized light emitted from the light source 1 enters the first beam splitter 2. The light reflected by the first beam splitter 2 enters the first photodetector 12, and the transmitted light enters the optical element 3 of the present invention. Here, the light entering the first photodetector 12 is converted into an electric signal that serves as an electric signal for monitoring the light quantity emitted from the light source 1, and this signal is input to the light quantity control circuit 15 so as to control the light source 1 to output an optimal light quantity (the light quantity of the light source 1 is controlled by light quantity control means). Next, with respect to the light transmitted through the first beam splitter 2 and entering the optical element 3 of the present invention, its light quantity is attenuated in the case of reproduction, while its light quantity is not attenuated in the case of recording (this aspect will be described later in detail).

The light transmitted through the optical element 3 of the present invention is mostly transmitted by the diffraction grating 4 and partially diffracted. The light transmitted through the diffraction grating 4 (both the transmitted light and the diffracted light) enters the second beam splitter 5. The light reflected by the second beam splitter 5 enters the first collecting lens 10 and further enters the second photodetector 13 by the first collecting lens 10. Furthermore, the light transmitted through the second beam splitter 5 enters the collimator lens 6. Here, since the light quantity of the light emitted from the light source 1 is controlled by the first photodetector 12 and the light quantity control circuit 15, an electric signal output from the second photodetector 13 serves as an electric signal for monitoring the light quantity of the light transmitted in accordance with the transmittance of the optical element 3 of the present invention.

Thus, this signal is input to the optical element control circuit 16 so as to control the optical element 3 of the present invention to have an optimal transmittance by the optical element control circuit 16 (a signal for controlling the transmittance of the optical element 3 is sent to the optical element 3 by optical element control means). The light entering the collimator lens 6 is converted into a parallel light by the collimator lens 6. The light transmitted through the collimator lens 6 is reflected by the mirror 7, travels in the direction deflected at an angle of 90 degrees from its travelling direction, and is focused on the optical recording medium 9 by the objective lens 8.

Next, the light reflected from the optical recording medium 9 is transmitted through the objective lens 8, reflected by the mirror 7, transmitted through the collimator lens 6, reflected by the second beam splitter 5, focused by the second collecting lens 11 and enters the third photodetector 14. The third photodetector 14 outputs a focus error signal showing the focused state of the light on the optical recording medium 9 or a tracking error signal showing the irradiated position of the light. In this case, for example, the tracking error signal is obtained by the phase difference method in the case of an optical recording medium used exclusively for reproduction and by the 3-beam method using a sub-beam created by the diffraction grating 4 in the case of an optical recording medium for recording.

Based on the focus error signal, focus control means not shown in the drawing controls the position of the objective lens 8 in its optical axial direction such that the light is collected constantly on the optical recording medium 9 in the focused state. Furthermore, based on the tracking error signal, tracking control means not shown in the drawing controls the radial position of the objective lens 8 such that the light is focused on a desired track on the optical recording medium 9. Moreover, the information recorded in the optical recording medium 9 also is obtained from the third photodetector 14.

Figure 2:
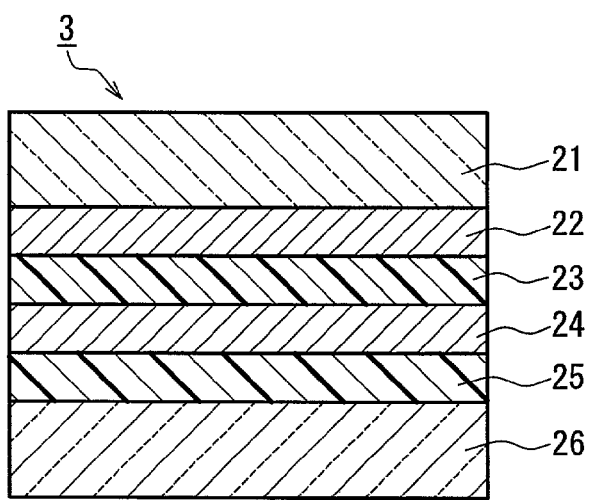
FIG. 2 is a cross-sectional view showing one example of an optical element according to Embodiment 1 of the present invention.

Here, the optical element 3 of the present invention will be described in detail. FIG. 2 is a cross-sectional view showing the optical element of the present invention. In FIG. 2, 21 is a first glass, 22 is a first ITO film, 23 is a polylactic acid film, 24 is a second ITO film, 25 is an analyzer film, and 26 is a second glass. Here, an optically active polymer film includes the polylactic acid film 23, and conductive transparent thin films include the first and second ITO films 22, 24, and a transmittance polarization anisotropic part includes the analyzer film 25. Here, the analyzer film 25 is a film to which an iodine compound is added, which is a film having a different absorptance for each linearly polarized light crossing perpendicular to each other. The operation of the optical element having this structure will be explained.

Figure 3A:
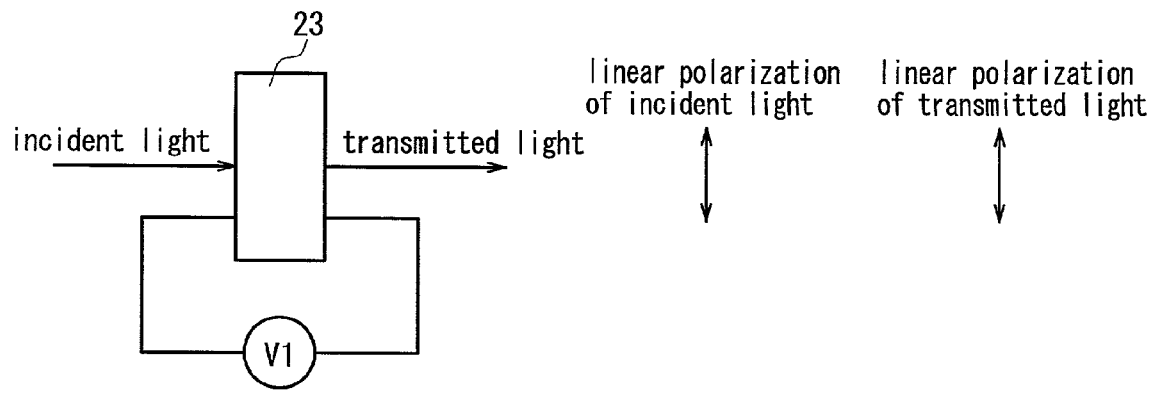
FIG. 3A and FIG. 3B are diagrams for explaining a change in polarization direction of a linearly polarized light before and after transmission caused by a voltage applied to an optically active polymer film of the present invention.
Figure 3B:
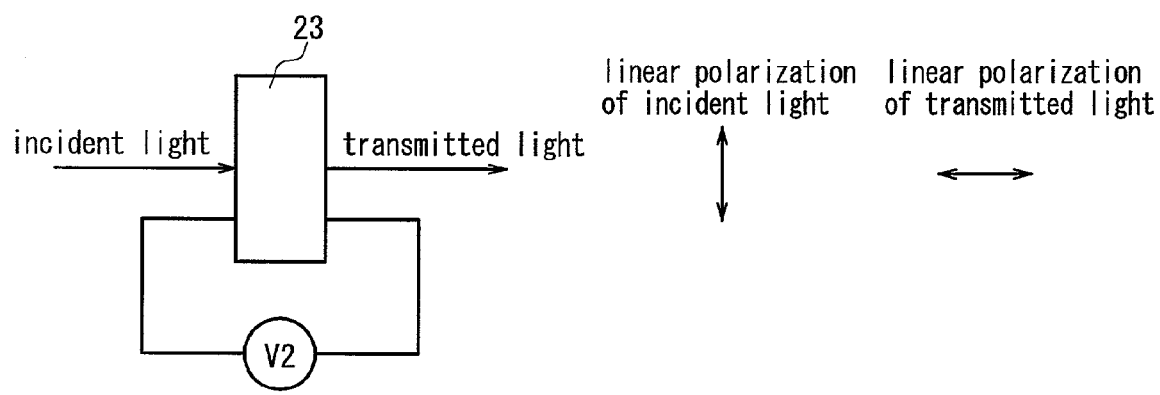

The polylactic acid film 23 has its molecular structure as a helical structure and has high optical activity. Furthermore, when a voltage is applied to this film, the optical activity is changed (See Functional Materials July Issue, 2000, vol. 20, No.7). Here, the material having a helical structure has helical molecules directed rightward and those directed leftward, and the optical rotation property is reversed by its direction. Here, a polylactic acid film having a helical structure directed rightward is used, but there is no problem in using a polylactic acid film having a helical structure directed leftward. As shown in FIG. 3A, when a linearly polarized light enters the polylactic acid film 23, and when a certain voltage (V1) is applied to the polylactic acid film 23 via the first and second ITO films 22, 24, the polarization direction of the transmitted light is the same polarization direction as that of the incident light. To the contrary, when a different volume of voltage (V2) is applied to the polylactic acid film 23 as shown in FIG. 3B, the polarization direction of the transmitted light is a polarization direction crossing perpendicular to the polarization direction of the incident light. Here, the linearly polarized light shown on both right sides of FIG. 3A and FIG. 3B shows the polarization direction of each polarized light seen from the travelling direction of the light. Furthermore, the response characteristic of the optical activity with respect to this voltage is several GHz, so that the demand for the optical head to be switched in 100 n seconds can be met. Polylactic acid is extremely fast with respect to this response characteristic. The same effect also can be achieved with a liquid crystal, but the response characteristic of the liquid crystal has its limitation at several MHz, so that the present liquid crystal technology is not suitable for switching of 100 n seconds.

Next, the analyzer film 25 will be explained. The absorptance of the analyzer film 25 changes in accordance with the direction of a linearly polarized light since the iodine compound is directed in a particular direction. In other words, a linearly polarized light of a certain direction is transmitted in a percentage of 100%, and a linearly polarized light of a direction crossing perpendicular to this polarization direction is absorbed in a percentage of 100%. As such an analyzer film 25, for example, an analyzer film containing iodine in a dope amount of not more than 10% can be used.

Thus, the analyzer film 25 is set in the direction that transmits approximately 100% of the light having the same polarization direction as the light entering the optical element 3 and that absorbs approximately 100% of the light crossing perpendicular to this polarization direction. Due to this configuration, when a certain voltage (VI) is applied, the light transmitted through the polylactic acid film 23 becomes the same linearly polarized light as the incident light and passes through the analyzer film 25 in a percentage of 100%. Therefore, the optical element 3 of the present invention has a transmittance of 100%.

Next, when a different volume of voltage (V2) is applied, the light transmitted through the polylactic acid film 23 becomes a linearly polarized light of a direction crossing perpendicular to the incident light and is absorbed 100% by the analyzer film 25. Therefore, the optical element 3 of the present invention has a transmittance of 0%.

Furthermore, when a voltage between V1 and V2 is applied, the light transmitted through the polylactic acid film 23 becomes a linearly polarized light having a direction that is rotated slightly from the polarization direction of the incident light and passes through the analyzer film 25 to some degree. Therefore, the optical element 3 of the present invention can change its transmittance in accordance with a voltage to be supplied. Here, when the analyzer film 25 is set in the direction that transmits approximately 100% of the light in the polarization direction emitted from the light source 1 and that absorbs approximately 100% of the light crossing perpendicular to this polarization direction, the light is transmitted at 100% by supplying a voltage of V1 at the time of recording, and when an appropriate voltage between V1 and V2 is supplied at the time of reproduction, the light is absorbed to some degree, so that the light quantity is attenuated.

Here, a thickness of the polylactic acid film 3 will be examined. As described above, a polylactic acid film has optical activity, so that the incident linearly polarized light is rotated even if a voltage is not applied. Thus, a certain voltage (V1) is applied to make the polarization directions of the linearly polarized light before and after transmission of the optical element 3 of the present invention match with each other, and a different volume of voltage (V2) is applied to make the polarization directions before and after transmission thereof cross perpendicular to each other. Here, for the purpose of improving stability against disturbance such as a drift of the applied voltage, which thereby causes a change in polarization direction of the light transmitted through the polylactic acid film 3, when the polarization directions of the linearly polarized light before and after transmission of the polylactic acid film 3 are made to match with each other at the time, for example, a voltage is not applied or a short circuit is made in the first ITO film 22 and the second ITO film 24, the stability of the element characteristic is improved even more. Therefore, it is necessary to determine the thickness of the polylactic acid film 3 considering the optical activity of polylactic acid itself.

Figure 4:
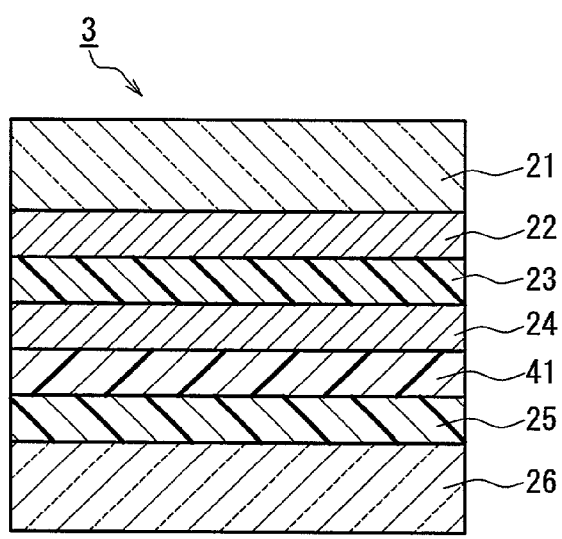
FIG. 4 is a cross-sectional view showing another example of an optical element according to Embodiment 1 of the present invention.

For example, an optical rotation property with respect to the thickness of polylactic acid is as large as 7200 degrees/mm, so that the optical rotation property reaches 360 degrees when the thickness is set to be 50 μm, and thus the directions of the linearly polarized light match with each other before and after transmission even if a voltage is not applied. However, due to such a large optical rotation property, when variations in thickness are to be considered, it is difficult to make the polarization directions match with each other before and after transmission without applying a voltage. Thus, an optical element will be examined in which the optical rotation property caused by an error in film thickness is corrected. FIG. 4 is a cross-sectional view showing an optical element in which the error in film thickness of polylactic is taken into account. In FIG. 4, 41 is a ½ wave plate (in this case, a ½ wave plate is used, but it is not necessarily limited to the use of this wave plate, and a K/2 wave plate (K is an odd number of 1 and above) may be used as well).

Here, an optically active polymer film includes the polylactic acid film 23; conductive transparent thin films include the first and second ITO films 22, 24; a transmittance polarization anisotropic part includes the analyzer film 25; and an optically active polymer film thickness correction part includes the ½ wave plate 41. This ½ wave plate can be formed, for example, by drawing a polyimide resin. The operation of the optical element having the aforementioned structure will be explained.

Figure 5A:
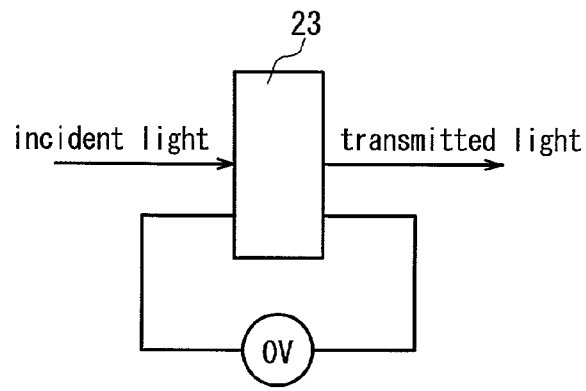
FIG. 5A and FIG. 5B are diagrams for explaining the relationship between a polarization direction of a linearly polarized light before and after transmission and a direction of an azimuth axis of a ½ wave plate in the optical element shown in FIG. 4.
Figure 5B:
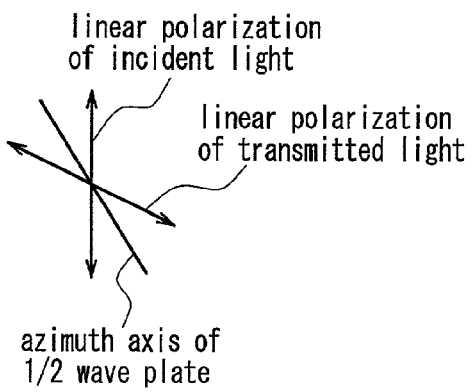

First, when a voltage is not applied or a voltage of 0V is applied (when the first ITO film 22 and the second ITO film 24 are short-circuited) (FIG. 5A), the linearly polarized light entering from the polylactic acid film 23 is converted into a linearly polarized light of a direction rotated to some degree from the linear polarization of the incident light as in FIG. 5B. Here, by setting the azimuth axis of the ½ wave plate 41 in the direction in which an angle formed between the polarization direction of the linearly polarized light before transmission and the polarization direction of the linearly polarized light after transmission is divided into two equal parts (See FIG. 5B), it becomes possible to convert the incident light into a linearly polarized light having the same direction as the incident linearly polarized light. In other words, by rotating the ½ wave plate 41, it becomes possible to match the polarization directions of the linearly polarized light before and after transmission with each other. Therefore, by setting the analyzer film 25 as mentioned above, approximately 100% is transmitted when a voltage is not applied. Thus, by disposing the ½ wave plate 41, it becomes possible to compensate for the rotated portion of the linearly polarized light by the optical activity arising from the thickness of the polylactic acid film 23.

Figure 6:
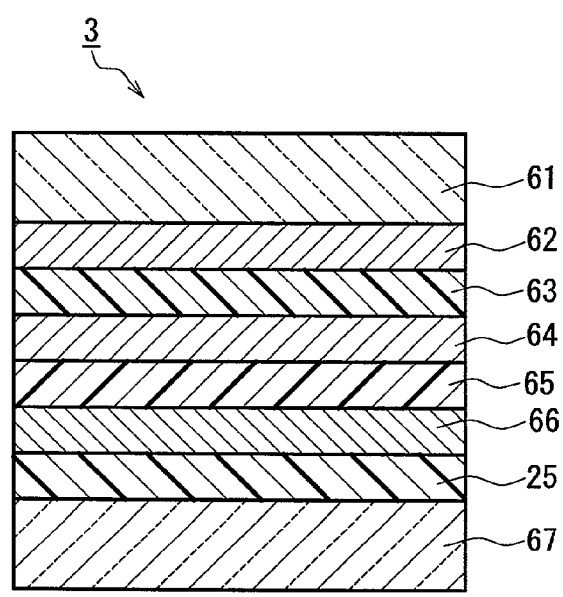
FIG. 6 is a cross-sectional view showing yet another example of an optical element according to Embodiment 1 of the present invention.

Next, a voltage to be applied to the optical element of the present invention will be described. As described above, the optical rotation property of the polylactic acid film 23 is changed by applying a voltage, but in order to change the polarization direction of the linear polarization of the transmitted light from the same direction as the polarization direction of the linear polarization of the incident light to the direction crossing perpendicular thereto, this optical rotation property needs to be changed in an amount of from at least 0 degree to 90 degrees, and therefore, a large voltage level of about 50V needs to be applied. Thus, an element structure is examined in which the same effect can be obtained even by lowering the voltage to be applied. FIG. 6 is a cross-sectional view of an optical element in which the polylactic acid film has a multilayer structure (in this case, it is a double-layer structure), which is a structure capable of lowering the applied voltage.

In FIG. 6, 61 is a first glass, 62 is a first ITO film, 63 is a first polylactic acid film, 64 is a second ITO film, 65 is a second polylactic acid film, 66 is a third ITO film, and 67 is a second glass. The characteristics of the optical element having this structure will be explained. First, a voltage of 25V, for example, is applied to the first ITO film 62, and a voltage of 0V is applied to the second ITO film 64. Thus, a voltage of 25V is applied to the first polylactic acid film 63, thereby having an optical rotation property of 45 degrees. Furthermore, when the same voltage as that for the first ITO film 62 is applied to the third ITO film 66, an electric field corresponding to 25V is applied to the second polylactic acid film 65, so that the second polylactic acid film 65 also has an optical rotation property of 45 degrees. Thus, the first and second polylactic acid films 63 and 65 together have an optical rotation property of 90 degrees. Therefore, by forming the polylactic acid film as a part of a multilayer structure, it becomes possible to reduce the voltage to be applied to the optical element in order to have a necessary optical rotation property. The analyzer film 25 is already described above, so that the explanation thereof is omitted. Here, the polylactic acid film was explained as a double-layer film, but by forming the polylactic acid film into a multilayer film with a larger number of layers, the applied voltage can be reduced accordingly.

In addition, in the case where the optical rotation property of the material is reversed by the direction of the electric field, the material having a helical structure in the opposite direction needs to be formed into a multilayer.

Next, controlling of a voltage applied to the optical element 3 of the present invention will be described in detail. In the case of recording, the transmittance of the optical element 3 of the present invention is set to be 100%, and in the case of reproduction, the transmittance of the optical element 3 of the present invention is set to be an appropriate value. Here, the light quantity emitted from the light source 1 changes when the temperature of the light source 1 changes even if a constant voltage is applied. Furthermore, the optical element 3 of the present invention also has temperature dependency with respect to the optical activity of the polylactic acid film, so that the polarization direction after transmission changes due to a temperature change even if a constant voltage is applied, thereby changing the transmittance of the optical element 3.

Thus, when only one monitor for receiving the light after being transmitted through the optical element 3 is used, it is not possible to judge whether the light quantity of the light source 1 has changed or the transmittance of the optical element 3 has changed, and when the light quantity of the light source 1 is changed correspondingly in all cases, light with a larger light quantity than predetermined might reach the optical recording medium 9 and delete the recorded information at the time of reproduction. Therefore, by monitoring the light quantity of the light source 1 and maintaining the light source 1 to have a constant light quantity, and by monitoring the light quantity after being transmitted through the optical element 3 and using this amount exclusively for monitoring the transmittance of the optical element 3, the light quantity of the light source 1 and the transmittance of the optical element 3 can be controlled perfectly. In the present embodiment, monitoring of the light quantity of the light source 1 uses the light split by the first beam splitter 2, received by the first photodetector 12 and converted into an electric signal, but it is also possible to monitor, for example, a back light (light emitted from the back side of a laser chip) of the light source 1, or alternatively, there is no problem in using the light which is emitted from the light source 1 but is subject to shading by a component used for the optical head. These cases are useful since there is no loss of the light used.

As described above, by using this optical element for an optical head, when reproduction is performed, the power on the surface can be suppressed for reproduction to a low power that is incapable of causing deterioration of an optical recording medium or deletion of data by reducing the transmittance of the optical element of the present invention, while setting the power of the light source to a power with sufficiently low quantum noise, and when recording is performed, the power of the light source can be used as it is for recording by setting the transmittance of the optical element of the present invention to be 100%. Furthermore, since the transmittance is switched very quickly, it becomes possible to perform recording instantaneously after an address reproduction. Moreover, since the transmittance is switched by an electric signal from the outside, the optical head can be miniaturized easily.

In addition, the optical element of the present invention is not limited to the configuration of having a laminated integral structure as shown in FIG. 2, FIG. 4 and FIG. 6. For example, the optical element of the present invention may have a structure in which the polylactic acid film and the ITO films on its both sides, the analyzer film, and the ½ wave plate are disposed separately from each other.

Embodiment 2

Next, a second embodiment of the present invention will be explained with reference to the drawings. The present embodiment differs from Embodiment 1 mentioned above only in that the optical element of the present invention has a different structure and serves also as a diffraction grating, and other than this aspect, the present embodiment is the same as Embodiment 1. Therefore, in the present embodiment, the configuration that is not particularly explained is understood as being the same as in Embodiment 1, and as long as there is no particular explanation, the component members which have been given the same reference numerals as in Embodiment 1 are understood as having the same function as in Embodiment 1.

FIG. 7 is a view showing the configuration of an optical head according to Embodiment 2 of the present invention. In FIG. 7, 71 is an optical element of the present invention. The operation of the optical head having the aforementioned structure will be explained with reference to FIG. 7. A light of linear polarization emitted from the light source 1 enters the first beam splitter 2. The light reflected by the first beam splitter 2 enters the first photodetector 12, and the transmitted light enters the optical element 71 of the present invention. Here, the light entering the first photodetector 12 is converted into an electric signal that serves as an electric signal for monitoring the light quantity emitted from the light source 1, and this signal is input to the light quantity control circuit 15 so as to control the light source 1 to output an optimal light quantity.

Next, the light transmitted through the first beam splitter 2 and entering the optical element 71 of the present invention is transmitted to some degree and the rest thereof is diffracted at the time of reproduction, and thus the light quantity is attenuated considerably, while the light is mostly transmitted and slightly diffracted at the time of recording. The diffraction efficiency in this case is that 90% is transmitted and 10% is diffracted as described in Embodiment 1 (this aspect will be described later in detail).

The light transmitted through the optical element 71 of the present invention (both the transmitted light and the diffracted light) enters the second beam splitter 5. From this process to focusing of the light on the optical recording medium to returning of the light reflected by the optical recording medium to the photodetector, the operation is the same as in Embodiment 1, so that the explanation thereof is omitted.

The third photodetector 14 outputs a focus error signal showing the focused state of the light on the optical recording medium 9 or a tracking error signal showing the irradiated position of the light. In this case, for example, the tracking error signal is obtained by the phase difference method in the case of an optical recording medium used exclusively for reproduction and by the 3-beam method using a sub-beam created by the optical element 71 of the present invention in the case of an optical recording medium for recording. Based on the focus error signal, focus control means not shown in the drawing controls the position of the objective lens 8 in its optical axial direction such that the light is collected constantly on the optical recording medium 9 in the focused state. Furthermore, based on the tracking error signal, tracking control means not shown in the drawing controls the radial position of the objective lens 8 such that the light is focused on a desired track on the optical recording medium 9. Moreover, the information recorded in the optical recording medium 9 also is obtained from the third photodetector 14.

Here, the optical element 71 of the present invention will be described in detail. The present embodiment differs from Embodiment 1 mentioned above only in that the portion for changing the transmittance in accordance with the polarization direction of the linearly polarized light is different, and other than this aspect, the present embodiment is the same as Embodiment 1. Therefore, in the present embodiment, the configuration that is not particularly explained is understood as being the same as in Embodiment 1, and as long as there is no particular explanation, the component members which have been given the same reference numerals as in Embodiment 1 are understood as having the same function as in Embodiment 1.

FIG. 8 is a cross-sectional view showing the optical element 71 of the present invention. In FIG. 8, 81 is a polarizing hologram, 82 is a polyimide film of a birefringent material and 83 is a UV curing resin of an isotropic material. Here, the transmittance polarization anisotropic part includes the polarizing hologram 81. Here, the polarizing hologram 81 is formed by etching the polyimide film 82 of a birefringent material and embedding the UV curing resin 83 of an isotropic material (See JP 63(1988)-026604A).

Furthermore, as a different structure, a predetermined portion of a lithium niobate substrate having birefringence is subject to a proton exchange, and this proton exchange part is etched to form the transmittance polarization anisotropic part (JP 6(1994)-27322A).

The operation of the optical element having the aforementioned structure will be explained. First, as already described in Embodiment 1, the incident linearly polarized light is converted into a linearly polarized light having the same direction as the incident light or converted into a linearly polarized light having a direction that is rotated slightly from the linearly polarized light of the incident light depending on the volume of a voltage to be applied to the polylactic acid film 23.

Next, the polarizing hologram 81 will be explained. As described above, the polarizing hologram 81 is formed by using a birefringent material, so that the diffraction efficiency with respect to a certain polarized light and the diffraction efficiency with respect to a polarized light of a direction crossing perpendicular to this polarized light are different. Therefore, for example, a certain polarized light is provided with the characteristics of 90% transmittance and 10% diffraction, and a polarized light of a direction crossing perpendicular to this polarized light is provided with the characteristics of, for example, 50% transmittance and 50% diffraction. Then, the polarizing hologram 81 is set in the direction that transmits approximately 90% of the linear polarization of the light entering the optical element 71 and that transmits approximately 50% of the linearly polarized light crossing perpendicular to this linearly polarized light.

Due to this configuration, when a certain voltage (V1) is applied, the light transmitted through the polylactic acid film 23 becomes the same linearly polarized light as the incident light and passes through the polarizing hologram 81 by a percentage of 90% and is diffracted by a percentage of 10%. Therefore, the optical element of the present invention has a transmittance of 90% and can form sub-beams (i first-order diffracted light). Next, when a different volume of voltage (V2) is applied, the light transmitted through the polylactic acid film 23 becomes a linearly polarized light of a direction crossing perpendicular to the incident light and is transmitted at 50% by the polarizing hologram 81. Therefore, the optical element of the present invention has a transmittance of 50%.

By using this optical element for an optical head, when reproduction is performed, the power on the surface can be suppressed for reproduction to a low power that is incapable of causing deterioration of an optical recording medium or deletion of data by reducing the transmittance of the optical element of the present invention, while setting the power of the light source to a power with sufficiently low quantum noise, and when recording is performed, almost all the power of the light source can be used for recording by setting the transmittance of the optical element of the present invention to be 90%, and in addition, a sub-beam needed for tracking can be formed.

Furthermore, since the transmittance is switched very quickly, it becomes possible to perform recording instantaneously after an address reproduction. Moreover, since the transmittance is switched by an electric signal from the outside, the optical head can be miniaturized easily.

In addition, although the transmittance at the time of reproduction was set to be 50% in the above description, the transmittance of the polarizing hologram 81 may be set in an appropriate value depending on the light quantity emitted from the light source 1.

Furthermore, although the polarization direction of the light transmitted through the polylactic acid film 23 is set either in the same direction as the incident light or in the direction crossing perpendicular thereto, by selecting the efficiency of the polarizing hologram 81 appropriately, the angle of the polarization direction of the light after being transmitted through the polylactic acid film 23 can be set as a different value from the one mentioned above.

Furthermore, FIG. 8 shows the optical element 71 in which the polylactic acid film 23 interposed between the ITO films 22, 24 and the polarizing hologram 81 are laminated into an integral structure, but both elements may be disposed separately from each other.

In addition, the optical element in which the transmittance is changed by changing its diffraction efficiency also is possible with the optical element having the structure shown in FIG. 9. In FIG. 9, 91 is a first glass, 92 is a first ITO film, 93 is a liquid crystal, 94 is a second ITO film and 95 is a second glass having a grating. The characteristics of the optical element having this structure will be explained with reference to FIG. 9. A refractive index of the liquid crystal 93 changes in accordance with a voltage to be applied. Thus, by changing the refractive index of the liquid crystal 93, the diffraction efficiency is varied. Therefore, 90% is transmitted and 10% is diffracted as described above at the time of recording, and it becomes possible to conduct a tracking control by using this diffracted light, and the light can be attenuated by transmitting 50% at the time of reproduction. However, the liquid crystal generally has a relatively slow response characteristic with respect to the refractive index, so that it is not possible to perform recording instantaneously after reproduction. Therefore, it requires a waiting time for recording after the refractive index is stabilized, that is, after the transmittance is stabilized.

Furthermore, since it is possible to change the optical rotation property of the liquid crystal, even if it is not possible to perform recording instantaneously after reproduction as described above, by setting a waiting time for recording after the transmittance is stabilized, the liquid crystal can be used as the optically active polymer film in the optical element of the present invention.

Furthermore, the liquid crystal can change its retardation, so that the same effect can be exhibited. Also in this case, it is not possible to perform recording instantaneously after reproduction as described above, by setting a waiting time for recording after the transmittance is stabilized, the liquid crystal can be used as the optically active polymer film in the optical element of the present invention.

In addition, in order to change the transmittance in accordance with the polarization direction, the optical elements' in Embodiment 1 and Embodiment 2 are formed such that either the absorptance is changed or the diffraction efficiency is changed in accordance with the polarization direction, but there is no problem in changing the transmittance by changing the reflectance. For example, FIG. 10 is a cross-sectional view of an optical element in which the reflectance is changed by the polarization direction. In FIG. 10, 101 is an obliquely deposited film of tantalum oxide, and 102 is a silicon dioxide thin film. Here, the obliquely deposited film 101 has birefringence, so that it is possible to change the reflectance in accordance with the polarization direction by forming a multilayer film together with the isotropic thin film 102. Also in this case, the polylactic acid film 22 and the ITO films 22, 24 on its both sides may be formed as a separate structure from the laminated body of the obliquely deposited film 101 and the silicon dioxide thin film 102.

Embodiment 3

Next, a third embodiment of the present invention will be explained with reference to the drawings. The present embodiment differs from Embodiment 1 mentioned above only in that the light source used is a second harmonic generation (SHG) blue laser (SHG light source) including a near-infrared semiconductor laser and a polarization inversion type waveguide device of the pseudo-phase matching system, and that the light quantity at the time of recording is changed by using the optical element of the present invention, and other than these aspects, the present embodiment is the same as Embodiment 1. Therefore, in the present embodiment, the configuration that is not particularly explained is understood as being the same as in Embodiment 1, and as long as there is no particular explanation, the component members which have been given the same reference numerals as in Embodiment 1 are understood as having the same function as in Embodiment 1.

FIG. 11 is a view showing the configuration of an optical head according to Embodiment 3 of the present invention. In FIG. 11, 111 is a light source that is constructed by using a second harmonic generation (SHG) blue laser (SHG light source) including a near-infrared semiconductor laser 112 and a polarization inversion type waveguide device 113 of the pseudo-phase matching system, and the optical element 3 is the one explained in Embodiment 1.

The operation of the optical head having the aforementioned structure will be explained with reference to FIG. 11. A linearly polarized light emitted from the light source 111 enters the first beam splitter 2. The light reflected by the first beam splitter 2 enters the first photodetector 12, and the transmitted light enters the optical element 3 of the present invention. Here, the light entering the first photodetector 12 is converted into an electric signal that serves as an electric signal for monitoring the light quantity emitted from the light source 111, and this signal is input to the light quantity control circuit 15 so as to control the light source 111 to output an optimal light quantity. Here, at the time of reproduction as well as at the time of recording, the light source 111 is set to emit a constant light quantity at all times. Next, with respect to the light transmitted through the first beam splitter 2 and entering the optical element 3 of the present invention, the light quantity is attenuated at the time of reproduction, while at the time of recording, the light quantity is not attenuated when marks are recorded, and the light quantity is attenuated to some degree when marks are not recorded (this aspect will be described later in detail).

The light transmitted through the optical element 3 of the present invention mostly is transmitted by the diffraction grating 4 and partially diffracted. The light transmitted through the diffraction grating 4 (both the transmitted light and the diffracted light) enters the second beam splitter 5. The light reflected by the second beam splitter 5 enters the first collecting lens 10 and further enters the second photodetector 13 by the first collecting lens 10. Furthermore, the light transmitted through the second beam splitter 5 enters the collimator lens 6.

Here, since the light quantity emitted from the light source 111 is controlled by the first photodetector 12 and the light quantity control circuit 15, an electric signal output from the second photodetector 13 serves as an electric signal for monitoring the transmittance of the optical element 3 of the present invention. This signal is input to the optical element control circuit 16 so as to control the optical element 3 of the present invention to have an optimal transmittance by the optical element control circuit 16.

The light entering the collimator lens 6 is converted into a parallel light by the collimator lens 6. The light transmitted through the collimator lens 6 is reflected by the mirror 7, travels in the direction deflected at an angle of 90 degrees from its travelling direction, and is focused on the optical recording medium 9 by the objective lens 8.

Next, the process up to returning of the light reflected by the optical recording medium to the photodetector is the same as in Embodiment 1, so that the explanation thereof is omitted.

The third photodetector 14 outputs a focus error signal showing the focused state of the light on the optical recording medium 9 or a tracking error signal showing the irradiated position of the light. In this case, for example, the tracking error signal is obtained by the phase difference method in the case of an optical recording medium used exclusively for reproduction and by the 3-beam method using a sub-beam created by the diffraction grating 4 in the case of an optical recording medium used for recording. Based on the focus error signal, focus control means not shown in the drawing controls the position of the objective lens 8 in its optical axial direction such that the light is collected constantly on the optical recording medium 9 in the focused state. Furthermore, based on the tracking error signal, tracking control means not shown in the drawing controls the radial position of the objective lens 8 such that the light is focused on a desired track on the optical recording medium 9. Moreover, the information recorded in the optical recording medium 9 also is obtained from the third photodetector 14.

Here, it will be examined with respect to making a change in light quantity for writing marks at the time of recording using the optical element 3 of the present invention. The light source 111 used in the present embodiment is a SHG light source, and the light (wavelength 810 nm) emitted from the near-infrared semiconductor laser 112 of this light source is converted into a light with a converted wavelength (wavelength 405 nm) at conversion efficiency in proportion to the light quantity of the light entering the polarization inversion type waveguide device 113 of the pseudo-phase matching system, and the light quantity of the light with a converted wavelength is in proportion to the light quantity of the light emitted from the near-infrared semiconductor laser 112, so that the light quantity of the light with a converted wavelength is in proportion to the square of the light quantity of the light emitted from the near-infrared semiconductor laser 112. Therefore, a recording signal that is input to an ordinary semiconductor laser light source when recording is performed using that light source cannot be used for the near-infrared semiconductor laser 112.

Furthermore, when the amount of emission from the semiconductor laser is changed in order to change the light quantity for recording, that is, when the light quantity of the light to be input to the polarization inversion type waveguide device 113 of the pseudo-phase matching system is changed, the wavelength at the same time is changed slightly. Here, since the polarization inverting type wave guide device 113 is extremely sensitive to the wavelength, when this device is used for recording, it is extremely difficult to conduct stable recording since it requires a circuit design considering also the portion of the wavelength fluctuation. Thus, the light quantity is modulated by using the optical element 3 in the present embodiment having a quick response speed, and the light source 111 is set to emit a constant light quantity like DC (direct current), which does not vary over time (the light quantity with which marks can be written in the optical recording medium).

As described in Embodiment 1, the transmittance of the optical element 3 in the present invention can be changed, so that at the time of recording, the transmittance of the optical element 3 is set to be 100% when marks are written, while the transmittance of the optical element 3 is reduced so as to attenuate the light quantity when marks are not recorded. Furthermore, at the time of reproduction, the transmittance of the optical element 3 is reduced and the light quantity is attenuated to the extent that marks are not written in the optical recording medium. Furthermore, the response speed of the optical element 3 in the present invention is several GHz, so that the switching speed (several n seconds) needed for recording can be met.

As described above, the optical element of the present invention can be used for modulation of the light quantity at the time of recording to construct an optical head in which recording can be conducted even by using a light source such as a SHG light source whose light quantity is difficult to modulate.

Furthermore, with the use of this optical element, when reproduction is performed, the power on the surface can be suppressed for reproduction to a low power that is incapable of causing deterioration of an optical recording medium or deletion of data by reducing the transmittance of the optical element of the present invention, while setting the power of the light source to a power with sufficiently low quantum noise, and modulation at the time of recording also can be performed with this element.

Therefore, it is enough for the light source to emit a constant light quantity at the time of reproduction as well as at the time of recording at all times, so that the stability with respect to temperature etc. is improved. Furthermore, since the transmittance is switched very quickly, it becomes possible to perform recording instantaneously after an address reproduction. Moreover, since the transmittance is switched by an electric signal from the outside, the optical head can be miniaturized easily.

In addition, the SHG light source was used as the light source in the description, but there is no problem in using the semiconductor laser used in Embodiment 1 described above.

In addition, Embodiment 1 to Embodiment 3 use the non-polarizing optical system, but there is no problem in using the polarizing optical system.

Embodiment 4

Next, a fourth embodiment of the present invention will be explained with reference to the drawings. The present embodiment differs from Embodiment 1 mentioned above only in that the optical system of the optical head is the polarizing optical system and that the optical element has a structure in which the analyzer film 25 is not provided in FIG. 2, and other than these aspects, the present embodiment is the same as Embodiment 1. Therefore, in the present embodiment, the configuration that is not particularly explained is understood as being the same as in Embodiment 1, and as long as there is no particular explanation, the component members which have been given the same reference numerals as in Embodiment 1 are understood as having the same function as in Embodiment 1.

Figure 12:
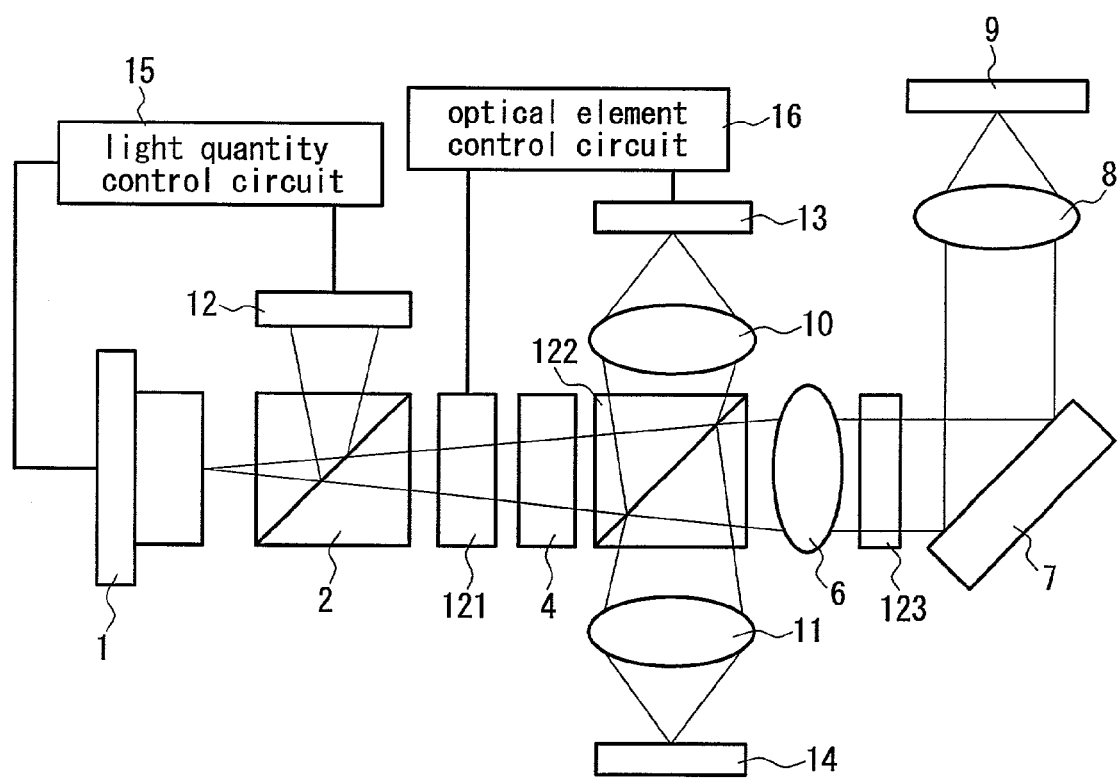
FIG. 12 is a schematic view showing one example of an optical head according to Embodiment 4 of the present invention.

In FIG. 12, 121 is a polylactic acid film (although not shown in the drawing, ITO films are disposed on both sides of this film), 122 is a polarizing beam splitter and 123 is a ¼ wave plate. Here, the focal optical system includes the collimator lens 6 and the objective lens 8; the light quantity control means includes the first photodetector 12 and the light quantity control circuit 15; the optical element control means includes the second photodetector 13 and the optical element control circuit 16; and polarization separation means includes the polarizing beam splitter 122 and the ¼ wave plate 123.

Here, a linearly polarized light emitted from the light source 1 is transmitted through the polarizing beam splitter 122 at a percentage of 100%, and a linearly polarized light of a direction crossing perpendicular to the linearly polarized light emitted from the light source 1 is reflected at a percentage of 100%. The 1/4 wave plate 123 is an optical element that converts a linearly polarized light into a circularly polarized light and is composed of, for example, a birefringent material such as a crystal. The ¼ wave plate is used in this case, but it is sufficient as long as it is a L/4 wave plate (L is an odd number of 1 and above).

The operation of the optical head having the aforementioned structure will be explained with reference to FIG. 12. A light of linear polarization emitted from the light source 1 enters the first beam splitter 2. The light reflected by the first beam splitter 2 enters the first photodetector 12, and the transmitted light enters the polylactic acid film 121. Here, the light entering the first photodetector 12 is converted into an electric signal that serves as an electric signal for monitoring the light quantity emitted from the light source 1, and this signal is input to the light quantity control circuit 15 so as to control the light source 1 to output an optimal light quantity.

Next, with respect to the light transmitted through the first beam splitter 2 and entering the polylactic acid film 121, the light is converted into a linearly polarized light whose polarization direction is rotated by a certain angle in the case of reproduction, and in the case of recording, the light is converted into a linearly polarized light whose polarization direction is rotated by a different angle from the angle at the time of reproduction. These rays of light are mostly transmitted by the diffraction grating 4 and partially diffracted. The light transmitted through the diffraction grating 4 (both the transmitted light and the diffracted light) enter the polarizing beam splitter 122. Here, in accordance with the rotational angle of the linearly polarized light, the transmitted light and the reflected light are separated differently. In other words, the light quantity of the light transmitted through the polarizing beam splitter 122 at the time of reproduction is different from that at the time of recording (this aspect will be described later in detail). The light reflected by the polarizing beam splitter 122 enters the first collecting lens 10 and enters the second photodetector 13 by the first collecting lens 10. Furthermore, the light transmitted through the polarizing beam splitter 122 enters the collimator lens 6.

Here, since the light quantity emitted from the light source 1 is controlled by the first photodetector 12 and the light quantity control circuit 15, an electric signal output from the second photodetector 13 serves as an electric signal for monitoring the polarization direction of the linearly polarized light rotated by the polylactic acid film 121. This signal is input to the optical element control circuit 16 so as to control the polylactic acid film 121 to have an optimal optical rotation property by the optical element control circuit 16. The light entering the collimator lens 6 is converted into a parallel light by the collimator lens 6 and enters the ¼ wave plate 123. The light is converted from a linearly polarized light into a circularly polarized light by the ¼ wave plate 123, and this circularly polarized light is reflected by the mirror 7, travels in the direction deflected at an angle of 90 degrees from its original travelling direction, and is focused on the optical recording medium 9 by the objective lens 8.

Next, the light reflected from the optical recording medium 9 is transmitted through the objective lens 8, reflected by the mirror 7 and enters the ¼ wave plate 123. This circularly polarized light is converted into a linearly polarized light in the polarization direction of a direction crossing perpendicular to the polarization direction of the linearly polarized light emitted from the light source 1 by the ¼ wave plate 123, transmitted through the collimator lens 6, reflected by the polarizing beam splitter 122, focused by the second collecting lens 11 and enters the third photodetector 14. The third photodetector 14 outputs a focus error signal showing the focused state of the light on the optical recording medium 9 or a tracking error signal showing the irradiated position of the light. In this case, for example, the tracking error signal is obtained by the phase difference method in the case of an optical recording medium used exclusively for reproduction and by the 3-beam method using a sub-beam created by the diffraction grating 4 in the case of an optical recording medium for recording.

Based on the focus error signal, focus control means not shown in the drawing controls the position of the objective lens 8 in its optical axial direction such that the light is collected constantly on the optical recording medium 9 in the focused state. Furthermore, based on the tracking error signal, tracking control means not shown in the drawing controls the radial position of the objective lens 8 such that the light is focused on a desired track on the optical recording medium 9. Moreover, the information recorded in the optical recording medium 9 also is obtained from the third photodetector 14.

Here, it will be explained in detail with respect to the change in light quantity of the light transmitted through the polarizing beam splitter 122 at the time of reproduction and at the time of recording. As described above, the polylactic acid film 121 has optical activity, and the optical rotation property is changed in accordance with a voltage to be applied from the outside. Thus, it is set such that a voltage of V3 is applied to the polylactic acid film 121 at the time of reproduction, so that the polarization direction of the linearly polarized light transmitted through the polylactic acid film 121 is rotated by an angle "a" from the polarization direction of the linear polarization of the incident light. This aspect is shown in FIG. 13A.

Furthermore, it is determined such that a voltage of V4 is applied to the polylactic acid film 121 at the time of recording, so that the polarization direction of the linearly polarized light transmitted through the polylactic acid film 121 is rotated by an angle "b" from the polarization direction of the linear polarization of the incident light. This aspect is shown in FIG. 13B.

This rotated light enters the polarizing beam splitter 122, and a light quantity It (reproduction) of the transmitted light and a light quantity Ir (reproduction) of the reflected light in the case of reproduction as well as a light quantity It (recording) of the transmitted light and a light quantity Ir (recording) of the reflected light in the case of recording in the polarizing beam splitter 122 are expressed as follows, where I is a light quantity of an incident light, T1 is a transmittance and R1 is a reflectance with respect to a linearly polarized light emitted from the light source 1 of the polarizing beam splitter 122, T2 is a transmittance and R2 is a reflectance with respect to a linearly polarized light of a direction crossing perpendicular to the polarized light emitted from the light source 1:

$$It(\text{reproduction}) = T1 \times I \times \cos(a) + T2 \times I \times \sin(a) \quad \text{(Formula 1)}$$

$$Ir(\text{reproduction}) = R1 \times I \times \cos(a) + R2 \times I \times \sin(a) \quad \text{(Formula 2)}$$

$$It(\text{recording}) = T1 \times I \times \cos(b) + T2 \times I \times \sin(b) \quad \text{(Formula 3)}$$

$$Ir(\text{recording}) = R1 \times I \times \cos(b) + R2 \times I \times \sin(b) \quad \text{(Formula 4)}$$

Therefore, when the transmittance and the reflectance of the polarizing beam splitter 122 are set as described above, by setting the angle a to be 60 degrees, 40% of the light quantity of the light from the light source is transmitted and 60% thereof is reflected. Furthermore, by setting the angle b to be 25 degrees, approximately 90% of the light quantity of the light from the light source is transmitted and 10% thereof is reflected. Thus, by applying a different voltage to the polylactic acid film 121 at the time of reproduction and at the time of recording, the light quantity transmitted through the polarizing beam splitter can be made variable.

Furthermore, as described in Embodiment 1, consideration will be given in terms of not applying a voltage or alternatively short circuiting at the time of reproduction or at the time of recording in order to stabilize the optical rotation property. The optical element for conducting this operation is shown as a cross-section view in FIG. 14. In FIG. 14, 141 is a first glass, 142 is a first ITO film, 143 is a polylactic acid film, 144 is a second ITO film, 145 is a ½ wave plate and 146 is a second glass. Here, it is determined such that the same voltage is applied to the first and second ITO films 142, 144, and that a voltage is not applied to the polylactic acid film 143. At this time, it becomes possible to correct the amount of deviation in the optical rotation property caused by an error in film thickness of the polylactic acid film 143 by disposing the ½ wave plate 145. This aspect was already described in Embodiment 1, so that the explanation thereof is omitted.

According to the aforementioned configuration, when reproduction is performed, the power on the surface can be suppressed for reproduction to a low power that is incapable of causing deterioration of an optical disc or deletion of data by reducing the transmittance of the polarizing beam splitter 122, while setting the power of the light source to a power with sufficiently low quantum noise, and when recording is performed, the power of the light source can be used considerably for recording by setting the transmittance of the polarizing beam splitter 122 to be 90%. Furthermore, since the transmittance is switched very quickly, it becomes possible to perform recording instantaneously after an address reproduction. Moreover, since the transmittance is switched by an electric signal from the outside, the optical head can be miniaturized easily. In addition, since the polarizing optical system is used, the light quantity emitted from the light source can be used efficiently.

In addition, in the aforementioned example, the polarizing beam splitter 122 has the characteristics of transmitting 100% with respect to the linearly polarized light in the same direction as the linearly polarized light emitted from the light source 1 and reflecting 100% with respect to the linearly polarized light crossing perpendicular to the linearly polarized light emitted from the light source 1. However, since the light quantity of the light transmitted through the polarizing beam splitter 122 results in the amounts shown from (Formula 1) to (Formula 4), the transmittance of the polarizing beam splitter 122 may be set as a value other than the above value.

Furthermore, the optical element integrated with the polylactic acid film 121 and the ½ wave plate 145 was used (See FIG. 14), but the same effect can be exhibited even if the polylactic acid film and the ½ wave plate are disposed separately. In this case, it is advantageous in that the rotational deviation etc. of the linearly polarized light emitted from the light source can be removed by rotating the ½ wave plate after being incorporated into the optical head. Furthermore, with the structure shown in FIG. 12, it is possible to conduct modulation at the time of recording as described in Embodiment 3.

Furthermore, the optical head in the present Embodiment 4 uses the polarizing optical system, but there is no problem in using the non-polarizing optical system as long as a polarizing beam splitter is provided and the transmittance is changed.

Furthermore, the optical elements of the present invention in Embodiments 1 to 4 described above all have the structure of being interposed between glass layers simply for the purpose of improving the reliability, but this does not mean that glass layers must be provided.

Furthermore, the optical element of the present invention is not provided with an antireflection coating, but it is advantageous to have an antireflection coating because a loss in the optical element is eliminated.

Embodiment 5

Figure 15:
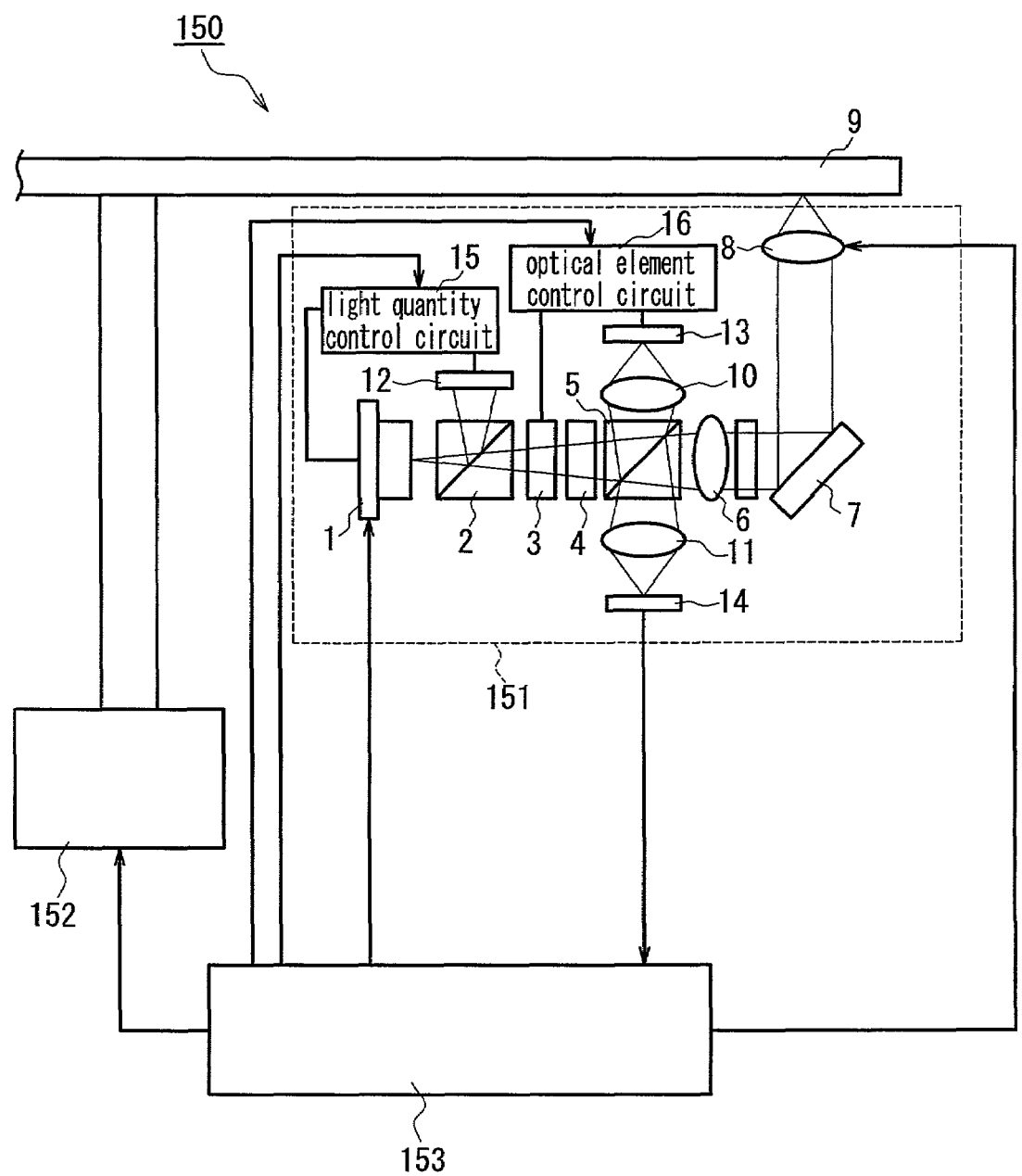
FIG. 15 is a schematic view showing one example of an optical recording reproduction device of the present invention.

In a fifth embodiment, an example of an optical recording reproduction device of the present invention will be explained. The optical recording reproduction device in Embodiment 5 is a device that records and reproduces a signal with respect to an optical recording medium. FIG. 15 is a schematic view showing the configuration of an optical recording reproduction device 150 in Embodiment 5. The optical recording reproduction device 150 includes an optical head 151, a motor 152 and a processing circuit 153. The optical head 151 is the one described in Embodiment 1. Since the optical head 151 is the same as the one described in Embodiment 1, the redundant explanation will be omitted.

Next, the operation of the optical recording reproduction device 150 will be explained. First, when the optical recording medium 9 is set in the optical recording reproduction device 150, the processing circuit 153 outputs a signal for rotating the motor 152 and rotates the motor 152. Next, the processing circuit 153 drives the light source 1 so that the light is emitted and gives an instruction to the light quantity control circuit 15 for controlling the light quantity to be emitted. Furthermore, an instruction is given also to the optical element control circuit 16 so that the transmittance of the optical element 3 is set to be an optimal value at the time of reproduction and recording. The light emitted from the light source 1 is reflected by the optical recording medium 9 and enters the third photodetector 14. The third photodetector 14 outputs a focus error signal showing the focused state of the light on the optical recording medium 9 and a tracking error signal showing the irradiated position of the light to the processing circuit 153. Based on these signals, the processing circuit 153 outputs a signal that controls the objective lens 8, and thus the light emitted from the light source 1 is focused on a desired track on the optical recording medium 9. Furthermore, based on the signal output from the third photodetector 14, the processing circuit 153 reproduces information recorded in the optical recording medium 9.

As described above, since the optical head in Embodiment 1 is used as the optical head 151, the optical recording reproduction device can be constructed as a device in which, when reproduction is performed, the power on the surface can be suppressed for reproduction to a low power that is incapable of causing deterioration of an optical recording medium or deletion of data by reducing the transmittance of the optical element 3 of the present invention, while setting the power of the light source to a power with sufficiently low quantum noise, and when recording is performed, the power of the light source can be used as it is by setting the transmittance of the optical element 3 of the present invention to be 100%.

Furthermore, since it is possible to perform reproduction with less quantum noise from the light source, the optical recording reproduction device can be constructed as a device capable of obtaining a stable control signal or a reproduction signal. Furthermore, since the transmittance is switched very quickly, it becomes possible to perform recording instantaneously after an address reproduction. Moreover, since the transmittance is switched by an electric signal from the outside, the optical head is miniaturized easily and thus it is also suitable for miniaturizing the optical recording reproduction device.

Furthermore, the optical head was described by using the optical head in Embodiment 1, but there is no problem in using the optical head described in Embodiment 2 to Embodiment 4. In addition, when the optical head in Embodiment 3 is used, stable recording can be performed.

Furthermore, a single lens is used as the objective lens 8, but there is no problem in using a combined lens having a high NA ratio. Moreover, when a lens having a high NA ratio is used, higher density can be achieved, and the level of requirement for the stability of a reproduction signal against noise of the light source also becomes rigorous, so that the present invention becomes extremely useful.

As described above, the embodiments of the present invention were described above by referring to examples. However, the present invention is not limited to the above-mentioned embodiments and can be applied to other embodiments based on the technical concept of the present invention.

Furthermore, the optical heads shown in Embodiments 1 to 5 mentioned above were of the infinite system. However, an optical head of the finite system that does not use a collimator lens may be used.

Furthermore, Embodiments 1 to 5 mentioned above were described with reference to the optical recording media in which information is recorded only optically. However, also with respect to optical recording media in which information is recorded optically and magnetically, the same effect naturally can be obtained by using the optical element of the present invention.

Furthermore, a polylactic acid film was used as the optically active polymer film. However, any material in which the optical rotation property is changed in accordance with a voltage to be applied from the outside may be used, and a polysilane film, for example, is also possible.

Furthermore, the above-mentioned embodiments were described with respect to the cases where the optical recording media were optical discs. However, the embodiments can be applied to an optical information recording reproduction device that performs similar functions for a card-type optical recording medium or the like.

As described above, a polylactic acid film has a similar function to a liquid crystal. In addition, a polylactic acid film can be combined with the transmittance polarization anisotropic part, thereby changing the transmittance of incident light in accordance with an outside voltage to be applied. Thus, it is possible to apply the polylactic acid film to an imaging apparatus. In this case, such an apparatus can switch images faster than an imaging apparatus using a liquid crystal, making it possible to achieve an imaging apparatus in which an afterimage when switching images hardly is obtrusive.

The optical heads in Embodiment 1 to 5 mentioned above are equipped respectively with an optical element that includes an optically active polymer film in which the optical rotation property is changed by an electric signal. A polylactic acid film was shown as an example of such an optically active polymer film. However, the optical rotation property of the polylactic acid film with respect to an applied voltage is varied greatly depending on its manufacturing method. For example, according to a method such as the one disclosed in JP 9(1997)-266918A of heating polylactic acid at a temperature of not less than the glass transition point and not more than the melting point and drawing it, the oriented direction of polylactic acid is not directed in a specific direction, so that the crystallinity is less, and thus the optical rotation property is scarcely changed regardless of the voltage applied from the outside. Therefore, this film cannot be used as the optically active polymer film of the present invention.

Thus, a method for manufacturing an optically active polymer film with which an optical element capable of switching between recording and reproduction in a shorter time can be formed, and which can be mass-produced easily will be described below.

Embodiment 6

In Embodiment 6, one example of a method for manufacturing an optically active polymer film of the present invention will be described.

FIG. 16A to FIG. 16E are process drawings showing a method for manufacturing a polylactic acid film serving as one example of an optically active polymer. Here, 201 is a first glass substrate, 202 is a second glass substrate, 203 is a first ITO (indium-tin-oxide alloy) film, 204 is a second ITO film, 205 is a filler, 206 is polylactic acid in a powdery state, 207 is polylactic acid in a molten state and 208 is a polylactic acid film formed as a thin film. Here, the first and second ITO films 203, 204 are conductive transparent films, and the filler 205 is a glass sphere whose size is strictly controlled.

Figure 16A:
FIG. 16A to FIG. 16E are cross-sectional views showing the sequential steps of one example of a method for manufacturing a polylactic acid film according to Embodiment 6 of the present invention.
Figure 16B:
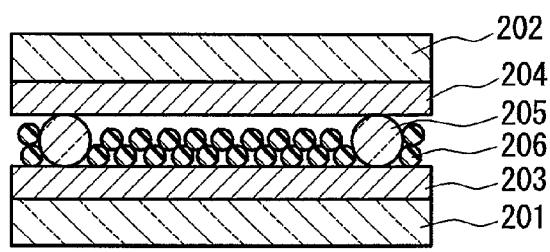
Figure 16C:
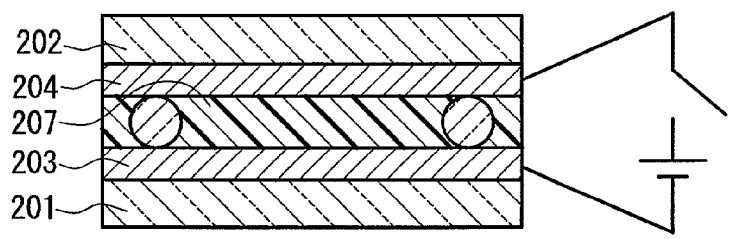
Figure 16D:
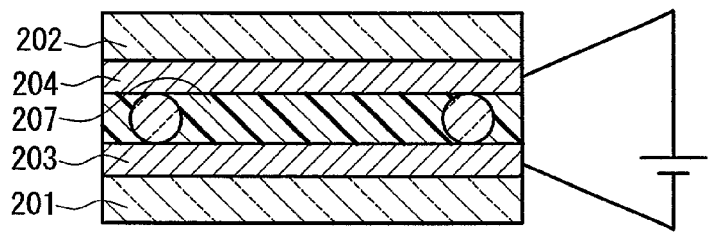
Figure 16E:
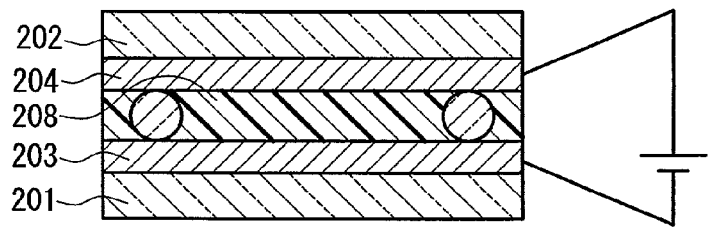

The method for manufacturing the polylactic acid film 208 will be explained by referring to FIG. 16A to FIG. 16E. First, on one surface of the first glass substrate 201 and of the second glass substrate 202, the first and second ITO films 203, 204 of conductive transparent films are formed by sputtering (FIG. 16A). Next, powder (or a pellet) of polylactic acid 206 is disposed on top of the first ITO film 203 formed on the first glass substrate 201, and the filler 205 for determining the dimension (for example, thickness 300 μm) of a space between the first glass substrate 201 and the second glass substrate 202 is disposed. This space determines the thickness of the manufactured polylactic acid film 208. In addition, the second glass substrate 202 is disposed such that the second ITO film 204 is faced with the first ITO film 203 (FIG. 16B). Then, in this state, the polylactic acid in the powdery state 206 is heated at least to the melting point (for example, 180° C.) so as to change the polylactic acid in the powdery state into polylactic acid in the molten state 207 (FIG. 16C). The upper limit of the heating temperature at this time is not particularly limited, but the temperature preferably is not more than 250° C. for preventing the polylactic acid from being pyrolyzed by heat. According to this process, the polylactic acid is changed to a liquid state, so that the polylactic acid molecules are vibrating at random. Next, in order to apply an electric field to the polylactic acid in the state in which the polylactic acid is in the molten state, a voltage (for example, 6 kV/mm) is applied to the first and second ITO films 203, 204 (FIG. 16D). According to this process, the direction of the polylactic acid molecules can be changed from the random direction and maintained in the direction parallel to the electric field generated by the applied voltage (in the direction perpendicular to the glass substrates 201 and 202). Then, it is cooled in the state in which the voltage is applied to form a thin film of the polylactic acid (FIG. 16E). According to this process, the polylactic acid can be made solid while maintaining the direction of the polylactic acid molecules in the direction perpendicular to the substrates.

Next, controlling the thickness of the polylactic acid film 208 by disposing the filler 205 between the first glass substrate 201 and the second glass substrate 202 will be explained. The polylactic acid film 208 has an extremely high optical activity of 7200 degrees/mm, so that the optical rotation property of the polylactic acid film 208 is changed greatly by the thickness thereof. Therefore, when it is desired to set the initial optical rotation property to be a certain value, for example, 0 degree (to be an integral multiple of 360 degrees), it is necessary to control the thickness of the polylactic acid film 208, and the thickness of the polylactic acid film can be controlled easily by using the filler 205.

Next, the filler 205 will be explained. As shown in FIG. 16E, the filler 205 is present also in an area where the light is transmitted, so that in considering the utilization efficiency of the light, it is preferable to have its transmittance close to almost 100%. Furthermore, it is preferable that the refractive index of the filler 205 also is almost equal to the refractive index of the polylactic acid. Specifically, a difference in refractive index between the two preferably is not more than 0.3. When the refractive index of the filler 205 differs greatly from the refractive index of the polylactic acid, reflection occurs at the interface between the filler and the polylactic acid, so that the utilization efficiency of the light is deteriorated. However, when the filler is disposed in a part where light is not transmitted, the transmittance and the refractive index may be set as desired. Moreover, the filler is formed of glass in this case but may be formed of plastics as well. Furthermore, the glass transition point of this filler needs to be higher than the melting point of the polylactic acid.

The polylactic acid film 208 formed according to this manufacturing method includes molecules having very good orientation and thus having excellent crystallinity, and the optical rotation property is changed greatly in accordance with the outside voltage to be applied, so that, for example, the optical rotation property is changed as much as 90 degrees by applying 50V. When such a great change can be achieved, this film can be used as the optical element of the optical head mentioned above. In addition, since the optical rotation property of the polylactic acid film has a time of change of several n seconds, when the optical element using the polylactic acid film manufactured by the method described in the present embodiment is mounted on an optical head, a very quick switching from reproduction to recording becomes possible. Moreover, this manufacturing method is characterized by forming a polylactic acid film of a large area and then cutting it to form optical elements of a desired size instead of forming small optical elements one by one, so that it is easy to mass-produce the optical elements.

Here, cooling in the process of FIG. 16E may be performed either gradually or rapidly. The reason for this is that the direction of the polylactic acid molecules is determined by the electric field applied from the outside, so that the crystallinity is not affected by the cooling method. Here, when the polylactic acid film is formed by cooling gradually, internal stress does not remain in the polylactic acid film, and thus, a change in the transmission wavefront with respect to a temperature change of the optical element using the polylactic acid film becomes smaller. Moreover, when it is cooled rapidly, a shorter cooling time is required, so that the time for manufacturing the polylactic acid film can be shortened. Furthermore, the transparency of the polylactic acid film is improved more when it is cooled rapidly.

Here, a DC voltage is applied in the process of FIG. 16D, but there is no problem in using an AC voltage.

Here, the present embodiment has a structure in which polylactic acid in the powdery state is disposed between the first substrate and the second substrate and then heated to be molten. However, a film of polylactic acid may be disposed and then heated to be molten, or alternatively, polylactic acid that has already become molten in a different process may be poured between the substrates. Here, when polylactic acid in the solid state is disposed as described in the present embodiment, it is easy to dispose a desired weight of polylactic acid between the substrates. In particular, when polylactic acid in the powdery state is disposed, the weight control is easier.

Embodiment 7

Next, a method for manufacturing a polylactic acid film according to a seventh embodiment of the present invention will be described with reference to the drawings. The present embodiment differs from Embodiment 6 mentioned above only in that the method for controlling the oriented state of polylactic acid molecules is different, and other than this aspect, the present embodiment is the same as Embodiment 6. Therefore, in the present embodiment, the configuration that is not particularly explained is understood as being the same as in Embodiment 6, and as long as there is no particular explanation, the component members which have been given the same reference numerals as in Embodiment 6 are understood as having the same function as in Embodiment 6.

FIG. 17A to FIG. 17E are process drawings showing a method for manufacturing an optically active polymer film in Embodiment 7 of the present invention.

Figure 17A:
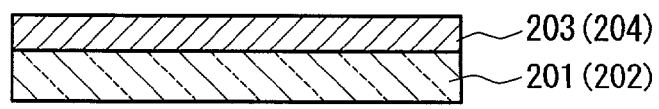
FIG. 17A to FIG. 17E are cross-sectional views showing the sequential steps of one example of a method for manufacturing a polylactic acid film according to Embodiment 7 of the present invention.
Figure 17B:
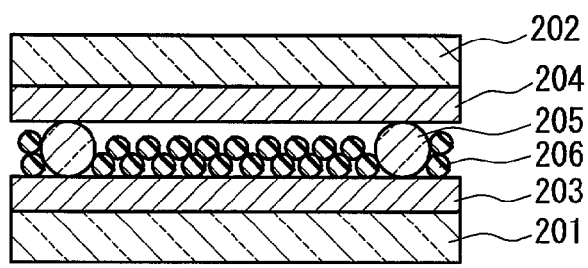
Figure 17C:
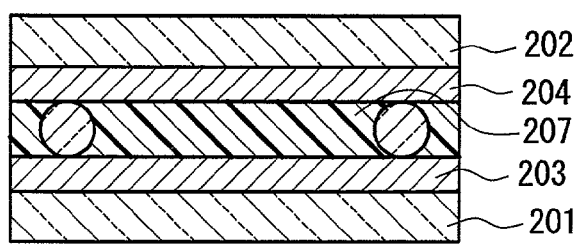
Figure 17D:
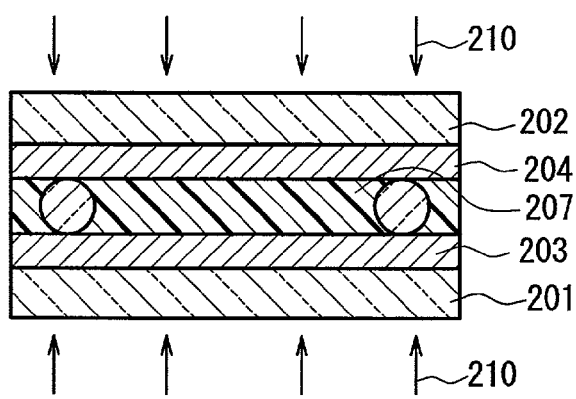
Figure 17E:
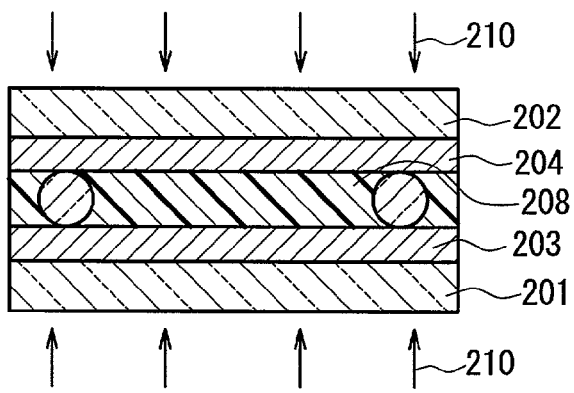

The method for manufacturing the polylactic acid film 208 serving as one example of an optically active polymer film will be explained by using FIG. 17A to FIG. 17E. First, on one surface of the first glass substrate 201 and of the second glass substrate 202, the first and second ITO films 203, 204 of conductive transparent films are formed by sputtering (FIG. 17A). Next, powder (or a pellet) of polylactic acid 206 is disposed on top of the first ITO film 203 formed on the first glass substrate 201, and the filler 205 for determining the dimension of a space between the first glass substrate 201 and the second glass substrate 202 is disposed. This space determines the thickness of the manufactured polylactic acid film 208. In addition, the second glass substrate 202 is disposed such that the second ITO film 204 is faced with the first ITO film 203 (FIG. 17B). Then, in this state, the polylactic acid in the powdery state 206 is heated at least to the melting point so as to change the polylactic acid in the powdery state into the polylactic acid in the molten state 207 (FIG. 17C). According to this process, the polylactic acid is changed to a liquid state, so that the polylactic acid molecules are vibrating at random. Next, in the state in which the polylactic acid is molten, opposing ultrasonic waves 210 are applied to the polylactic acid from the respective outer surfaces of the first and second glass substrates 201, 202 (FIG. 17D). According to this process, standing waves of the ultrasonic waves can be formed in the place where the polylactic acid is present, so that the direction of the polylactic acid molecules can be aligned from the random direction to the direction of the standing waves of the ultrasonic waves (in this case, the direction perpendicular to the glass substrates 201, 202). Then, it is cooled in the state in which the standing waves of the ultrasonic waves are formed to form a thin film of the polylactic acid (FIG. 17E). According to this process, the polylactic acid can be made solid while maintaining the direction of the polylactic acid molecules in the direction perpendicular to the substrates.

The polylactic acid film 208 formed according to this manufacturing method includes molecules having very good orientation and thus having excellent crystallinity, and the optical rotation property is changed greatly in accordance with the outside voltage to be applied, so that, for example, the optical rotation property is changed as much as 90 degrees by applying 50V. When such a great change can be achieved, this film can be used as the optical element of the optical head mentioned above. In addition, since the optical rotation property of the polylactic acid film has a time of change of several n seconds, when the optical element using the polylactic acid film manufactured by the method described in the present embodiment is mounted on an optical head, a very quick switching from reproduction to recording becomes possible. Moreover, this manufacturing method is characterized by forming a polylactic acid film of a large area and then cutting it to form optical elements of a desired size instead of forming small optical elements one by one, so that it is easy to mass-produce the optical elements.

Here, cooling in the process of FIG. 17E may be performed either gradually or rapidly. The reason for this is that the direction of the polylactic acid molecules is determined by the ultrasonic waves applied from the outside, so that the crystallinity is not affected by the cooling method. Here, when the polylactic acid film is formed by cooling gradually, internal stress does not remain in the polylactic acid film, and thus, a change in the transmission wavefront with respect to a temperature change of the optical element using the polylactic acid film becomes smaller. Moreover, when it is cooled rapidly, a shorter cooling time is required, so that the time for manufacturing the polylactic acid film can be shortened. Furthermore, the transparency of the polylactic acid film is improved more when it is cooled rapidly.

Here, in the process of FIG. 17D, the opposing ultrasonic waves are applied to form the standing waves of the ultrasonic wave by the interference therebetween. However, as shown in FIG. 18, the standing waves may be formed by applying the ultrasonic waves to the side of the outer surface of the second glass substrate 202, reflecting the ultrasonic waves with a reflector 212 disposed on the side of the outer surface of the first glass substrate 201 and causing an interference between the ultrasonic waves 201 and reflected waves 210'.

In the case where the ultrasonic waves are applied from the front and the back as in the present embodiment, the phase or the volume of the ultrasonic waves is controlled respectively for the ultrasonic waves applied from the front and the back, and thus, the standing waves applied to the polylactic acid film are controlled easily. Furthermore, when the ultrasonic waves are to be reflected, it is sufficient to perform only one control of the ultrasonic waves, so that the circuit configuration for controlling the standing waves of the ultrasonic waves can be simplified.

Embodiment 8

Next, an eighth embodiment of the present invention will be described with reference to the drawings. The present embodiment differs from Embodiment 6 mentioned above only in that the method for controlling the oriented state of polylactic acid molecules is different, and other than this aspect, the present embodiment is the same as Embodiment 6. Therefore, in the present embodiment, the configuration that is not particularly explained is understood as being the same as in Embodiment 6, and as long as there is no particular explanation, the component members which have been given the same reference numerals as in Embodiment 6 are understood as having the same function as in Embodiment 6.

FIG. 19A to FIG. 19E are process drawings showing a method for manufacturing an optically active polymer film in Embodiment 8 of the present invention.

Figure 19A:
FIG. 19A to FIG. 19F are cross-sectional views showing the sequential steps of one example of a method for manufacturing a polylactic acid film according to Embodiment 8 of the present invention.
Figure 19B:
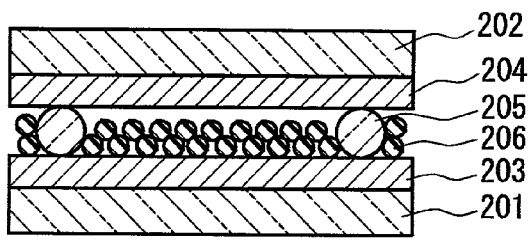
Figure 19C:
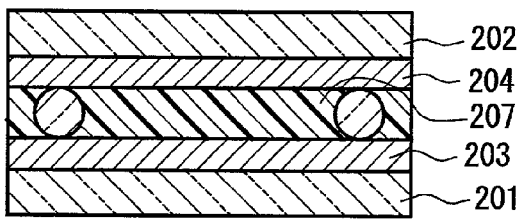
Figure 19D:
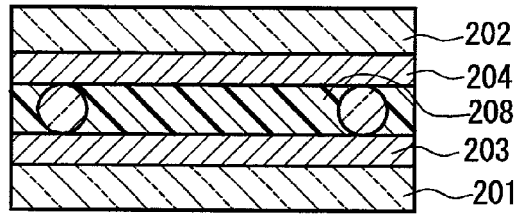
Figure 19E:
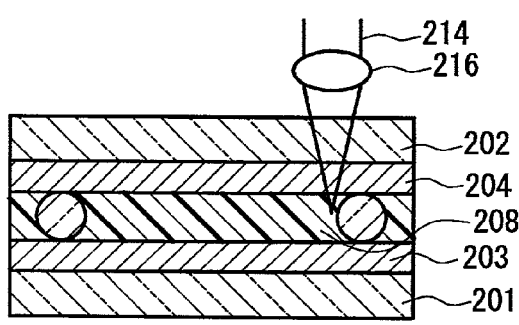
Figure 19F:
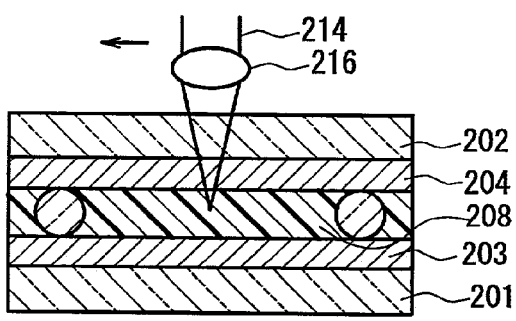
Figure 20:
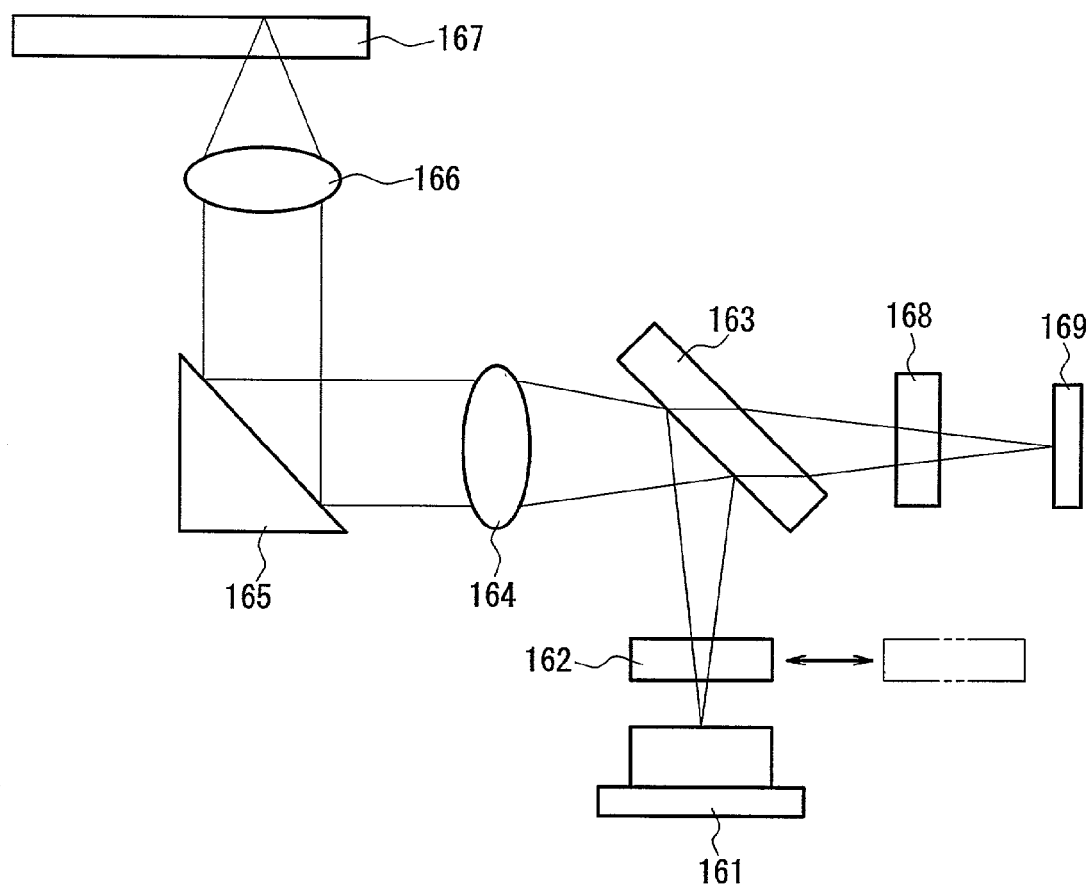
FIG. 20 is a schematic view showing one example of a conventional optical head.

The method for manufacturing the polylactic acid film 208 serving as one example of an optically active polymer film will be explained by using FIG. 19A to FIG. 19E. First, on one surface of the first glass substrate 201 and of the second glass substrate 202, the first and second ITO films 203, 204 of conductive transparent films are formed by sputtering (FIG. 19A). Next, powder (or a pellet) of polylactic acid 206 is disposed on top of the first ITO film 203 formed on the first glass substrate 201, and the filler 205 for determining the dimension of a space between the first glass substrate 201 and the second glass substrate 202 is disposed. This space determines the thickness of the manufactured polylactic acid film 208. In addition, the second glass substrate 202 is disposed such that the second ITO film 204 is faced with the first ITO film 203 (FIG. 19B). Then, in this state, the polylactic acid in the powdery state 206 is heated at least to the melting point so as to change the polylactic acid in the powdery state 206 into the polylactic acid in the molten state 207 (FIG. 19C). According to this process, the polylactic acid is changed to a liquid state, so that the polylactic acid molecules are vibrating at random. Next, the polylactic acid is cooled and made solid to form the polylactic acid film 208 (FIG. 19D). Here, the oriented direction of the polylactic acid molecules is a random direction. Next, ultrasonic waves 214 are converged on a part of the polylactic acid film 208 using a lens 216 (FIG. 19E). Thus, a part of the polylactic acid film 208 is melted by the energy of the ultrasonic waves 214, and furthermore, the oriented direction of the molecules of the polylactic acid film 208 is maintained in a desired direction by the vibration of the ultrasonic waves. Then, the converged ultrasonic waves 214 are shifted parallel to the surface of the second glass substrate 202 (FIG. 19F). Thus, the position where the ultrasonic waves 214 are converged is shifted, so that the original position is cooled rapidly to be made solid while maintaining the oriented direction of the molecules. Next, in a newly shifted position, the polylactic acid is melted like mentioned above, and furthermore, the oriented direction of the molecules is set in a desired direction.

The polylactic acid film 208 formed according to this manufacturing method includes molecules having very good orientation and thus having excellent crystallinity, and the optical rotation property is changed greatly in accordance with the outside voltage to be applied, so that, for example, the optical rotation property is changed as much as 90 degrees by applying 50V. When such a great change can be achieved, this film can be used as the optical element of the optical head mentioned above. In addition, since the optical rotation property of the polylactic acid film has a time of change of several n seconds, when the optical element using the polylactic acid film manufactured by the method described in the present embodiment is mounted on an optical head, a very quick switching from reproduction to recording becomes possible. Moreover, this manufacturing method is characterized by forming a polylactic acid film of a large area and then cutting it to form optical elements of a desired size instead of forming small optical elements one by one, so that it is easy to mass-produce the optical elements.

Here, the present embodiment has a structure in which the polylactic acid in the powdery state is disposed between the first substrate and the second substrate, heated then to be molten and cooled to form a film of polylactic acid to be disposed between the substrates. However, a film of polylactic acid that has been formed in a different process may be disposed, or alternatively, it is also possible to dispose the polylactic acid in the powdery state and partially applying ultrasonic waves in this state.

Here, when the polylactic acid in the powdery state is disposed between the substrates as described in the present embodiment, it is easy to conduct a weight control of the polylactic acid. In the case where a film of polylactic acid formed in a different process is disposed, the polylactic acid film having excellent orientation is formed by melting a part of the film, so that the thickness of the polylactic acid film having excellent orientation to be manufactured becomes equal to the thickness of this film. Therefore, a space of a desired size can be formed without using a separate member (the filler 205).

As described above, the embodiments of the manufacturing methods of an optically active polymer film in the present invention were explained by referring to examples. However, the present invention is not limited to the above-mentioned embodiments and can be applied to other embodiments based on the technical concept of the present invention.

Furthermore, in Embodiments 6 to 8 mentioned above, the molecular orientation of polylactic acid is controlled by providing an electric field or ultrasonic waves in the state in which the polylactic acid is melted. However, the same effect naturally can be obtained by controlling it in a different manner.

Moreover, Embodiments 6 to 8 mentioned above use a filler to control the thickness of a space between the glass substrates, but the filler is not necessarily needed.

Furthermore, Embodiments 6 to 8 mentioned above use polylactic acid as an optically active polymer, but there is no problem in using a different substance.

Polylactic acid can switch the polarization direction of the incident light instantaneously based on an external signal, so that polylactic acid can be used for an apparatus or for a device using a liquid crystal (such as a monitor). In addition, the switching speed is faster than the liquid crystal, so that the characteristics of the apparatus or the device is improved.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical element, comprising:
an optically active polymer film in which an optical rotation property changes in accordance with an outside voltage to be applied,
conductive transparent thin films disposed on both sides of the optically active polymer film for applying a voltage to the optically active polymer film, and
a transmittance polarization anisotropic part having a different transmittance with respect to a polarization direction, the transmittance polarization anisotropic part being disposed on a side opposite to the optically active polymer film on one of the conductive transparent thin films,
wherein the outside voltage to be applied ranges between a first and second voltage,
the first voltage providing the optical element with the optical rotation property capable of making a polarization direction of a light transmitted through the optical element match with that of an incident light, and
the second voltage providing the optical element with the optical rotation property capable of making the polarization direction of the light transmitted through the optical element perpendicular to that of the incident light.

2. An optical element, comprising:
an optically active polymer film in which an optical rotation property changes in accordance with an outside voltage to be applied,
conductive transparent thin films disposed on both sides of the optically active polymer film for applying a voltage to the optically active polymer film, and
an optically active polymer film thickness correction part for correcting an optical rotation property arising from an error in film thickness of the optically active polymer film, the optically active polymer film thickness correction part being disposed on a side opposite to the optically active polymer film on one of the conductive transparent thin films.

3. An optical element, comprising:
an optically active polymer film in which an optical rotation property changes in accordance with an outside voltage to be applied,
conductive transparent thin films disposed on both sides of the optically active polymer film for applying a voltage to the optically active polymer film,
an optically active polymer film thickness correction part for correcting an optical rotation property arising from an error in film thickness of the optically active polymer film, the optically active polymer film thickness correction part being disposed on a side opposite to the optically active polymer film on one of the conductive transparent thin films, and
a transmittance polarization anisotropic part having a different transmittance with respect to a polarization direction, the transmittance polarization anisotropic part being disposed on a side opposite to the conductive transparent thin film of the optically active polymer film thickness correction part.

4. The optical element according to any one of claims 1 to 3, wherein the optically active polymer film comprises a polylactic acid film.

5. The optical element according to claim 1 or 3, wherein a change in transmittance of the transmittance polarization anisotropic part occurs by a change in absorptance occurring in accordance with a polarization direction.

6. The optical element according to claim 5, wherein the transmittance polarization anisotropic part comprises an analyzer film.

7. The optical element according to claim 1 or 3, wherein a change in transmittance of the transmittance polarization anisotropic part occurs by a change in diffraction efficiency occurring in accordance with a polarization direction.

8. The optical element according to claim 7, wherein the transmittance polarization anisotropic part comprises a polarizing hologram.

9. The optical element according to claim 1 or 3, wherein a change in transmittance of the transmittance polarization anisotropic part occurs by a change in reflectance occurring in accordance with a polarization direction.

10. The optical element according to claim 9, wherein the transmittance polarization anisotropic part comprises a multilayer film including a birefringent film.

11. The optical element according to claim 2 or 3, wherein the optically active polymer film thickness correction part comprises a K/2 wave plate (K is an odd number of 1 and above).

12. The optical element according to any one of claims 1 to 3, wherein the optically active polymer film is formed into a multilayer structure.

13. An optical bead for recording or reproducing a signal with respect to an optical recording medium, the optical head comprising:
   a light source, and
   an optical element comprising:
      an optically active polymer film in which an optical rotation property changes in accordance with an outside voltage to be applied,
      conductive transparent thin films disposed on both sides of the optically active polymer film for applying a voltage to the optically active polymer film, and
      a transmittance polarization anisotropic part having a different transmittance with respect to a polarization direction, the transmittance polarization anisotropic part being disposed on a side opposite to the optically active polymer film on one of the conductive transparent thin films,
   wherein the optical element is disposed between the light source and the optical recording medium, and
   a voltage to be applied to the optical element is switched at the time of recording and at the time of reproduction.

14. An optical head for recording or reproducing a signal with respect to an optical recording medium, the optical head comprising:
   a light source, and
   an optical element according to any one of claims 1 to 3 disposed between the light source and the optical recording medium,
   wherein a recording signal is formed by changing a voltage to be applied to the optical element.

15. An optical head for recording or reproducing a signal with respect to an optical recording medium, the optical head comprising:
   a light source, and
   an optical element according to claim 7 disposed between the light source and the optical recording medium,
   wherein a diffracted light generated in the optical element is used to detect a tracking error signal.

16. An optical head for recording or reproducing a signal with respect to an optical recording medium, the optical head comprising:
   a light source,
   an optical element according to any one of claims 1 to 3 disposed between the light source and the optical recording medium,
   light quantity control means that receives light emitted from the light source and controls a light quantity of the light source, and
   optical element control means for controlling characteristics of the optical element.

17. An optical head for recording or reproducing a signal with respect to an optical recording medium, the optical bead comprising:
   a light source,
   an optical element comprising:
      an optically active polymer film in which an optical rotation property changes in accordance with an outside voltage to be applied,
      conductive transparent thin films disposed on both sides of the optically active polymer film for applying a voltage to the optically active polymer film, and
      a transmittance polarization anisotropic part having a different transmittance with respect to a polarization direction, the transmittance polarization anisotrovic part being disposed on a side opposite to the optically active polymer film on one of the conductive transparent thin films,
   wherein the optical element is disposed between the light source and the optical recording medium, and
   polarization separation means disposed between the optical element and the optical recording medium,
   wherein a voltage to be applied to the optical element is switched at the time of recording and at the time of reproduction.

18. An optical head for recording or reproducing a signal with respect to an optical recording medium, the optical head comprising:
   a light source,
   an optical element according to any one of claims 1 to 3 disposed between the light source and the optical recording medium, and
   polarization separation means disposed between the optical element and the optical recording medium,
   wherein a recording signal is formed by changing a voltage to be applied to the optical element.

19. An optical head for recording or reproducing a signal with respect to an optical recording medium, the optical head comprising:
   a light source,
   an optical element according to any one of claims 1 to 3 disposed between the light source and the optical recording medium,
   polarization separation means disposed between the optical element and the optical recording medium,
   light quantity control means that receives light emitted from the light source and controls a light quantity of the light source, and
   optical element control means for controlling characteristics of the optical element.

20. An optical head for recording or reproducing a signal with respect to an optical recording medium, the optical head comprising:
   a light source,
   an optically active polymer film in which an optical rotation property changes in accordance with an outside voltage to be applied, the optically active polymer film being disposed between the light source and the optical recording medium, and
   polarization separation means disposed between the optically active polymer film and the optical recording medium,
   wherein the voltage to be applied to the optically active polymer film element is switched at the time of recording and at the time of reproduction.

21. An optical head for recording or reproducing a signal with respect to an optical recording medium, the optical head comprising:
   a light source,
   an optically active polymer film in which an optical rotation property changes in accordance with an outside voltage to be applied, the optically active polymer film being disposed between the light source and the optical recording medium, and polarization separation means disposed between the optically active polymer film and the optical recording medium wherein a recording signal is formed by changing the voltage to be applied to the optically active polymer film.

22. An optical head for recording or reproducing a signal with respect to an optical recording medium, the optical head comprising:

a light source, an optically active polymer film in which an optical rotation property changes in accordance with an outside voltage to be applied, the optically active polymer film being disposed between the light source and the optical recording medium, an optically active polymer film thickness correction part for correcting an optical rotation property arising from an error in film thickness of the optically active polymer film, the optically active polymer film thickness correction part being disposed between the optically active polymer film and the optical recording medium, and polarization separation means disposed between the optically active polymer film thickness correction part and the optical recording medium, wherein the voltage to be applied to the optically active polymer film is switched at the time of recording and at the time of reproduction.

23. An optical head for recording or reproducing a signal with respect to an optical recording medium, the optical head comprising:

a light source, an optically active polymer film in which an optical rotation property changes in accordance with an outside voltage to be applied, the optically active polymer film being disposed between the light source and the optical recording medium, an optically active polymer film thickness correction part for correcting an optical rotation property arising from an error in film thickness of the optically active polymer film, the optically active polymer film thickness correction part being disposed between the optically active polymer film and the optical recording medium, and polarization separation means disposed between the optically active polymer film thickness correction part and the optical recording medium, wherein a recording signal is formed by changing the voltage to be applied to the optically active polymer film.

24. An optical head for recording or reproducing a signal with respect to an optical recording medium, the optical head comprising:

a light source, an optically active polymer film in which an optical rotation property changes in accordance with an outside voltage to be applied, the optically active polymer film being disposed between the light source and the optical recording medium, an optically active polymer film thickness correction part for correcting an optical rotation property arising from an error in film thickness of the optically active polymer film, the optically active polymer film thickness correction part being disposed between the optically active polymer film and the optical recording medium, polarization separation means disposed between the optically active polymer film thickness correction part and the optical recording medium, light quantity control means that receives light emitted from the light source and controls a light quantity of the light source, and optical element control means for controlling characteristics of the optically active polymer film.

25. An optical recording reproduction device for recording or reproducing a signal with respect to an optical recording medium, the optical recording reproduction device comprising:

an optical head for recording or reproducing a signal with respect to the optical recording medium, wherein the optical head includes a light source and an optical element according to any one of claims 1 to 3.

26. An optical recording reproduction device for recording or reproducing a signal with respect to an optical recording medium, the optical recording reproduction device comprising:

an optical head for recording or reproducing a signal with respect to the optical recording medium, wherein the optical head is an optical head according to any one of claims 20, 21, and 22 to 24.

27. The optical element according to any one of claims 1 to 3, wherein a first substrate having one of the conductive transparent thin films and a second substrate having the other of the conductive transparent thin films arc disposed such that the conductive transparent thin films face each other and a desired space is created between the two conductive transparent thin films, and a member having a desired size is disposed between the first and second substrates.

28. An optical bead for recording or reproducing a signal with respect to an optical recording medium, the optical head comprising:

a light source, and an optical element according to claim 2 disposed between the light source and the optical recording medium, wherein a voltage to be applied to the optical element is switched at the time of recording and at the time of reproduction.

29. An optical head for recording or reproducing a signal with respect to an optical recording medium, the optical head comprising:

a light source, and an optical element according to claim 3 disposed between the light source and the optical recording medium, wherein a voltage to be applied to the optical element is switched at the time of recording and at the time of reproduction.

30. An optical head for recording or reproducing a signal with respect to an optical recording medium, the optical head comprising:

a light source, an optical element according to claim 2 disposed between the light source and the optical recording medium, and polarization separation means disposed between the optical element and the optical recording medium, wherein a voltage to be applied to the optical element is switched at the time of recording and at the time of reproduction.

31. An optical head for recording or reproducing a signal with respect to an optical recording medium, the optical head comprising:

a light source,
an optical clement according to claim 3 disposed between the light source and the optical recording medium, and
polarization separation means disposed between the optical element and the optical recording medium, wherein a voltage to be applied to the optical element is switched at the time of recording and at the time of reproduction.

* * * * *

UNITED STATES PATENT AND TRADEMARK OFFICE
CERTIFICATE OF CORRECTION

PATENT NO. : 7,113,472 B2
APPLICATION NO. : 10/096674
DATED : September 26, 2006
INVENTOR(S) : Wada et al.

It is certified that error appears in the above-identified patent and that said Letters Patent is hereby corrected as shown below:

First page, column 2, line 1 of OTHER PUBLICATIONS: "Jul. 2000," should be omitted.
Column 35, line 66(claim 1): "clement" should read --element--.
Column 37, line 8(claim 13): "optical bead" should read --optical head--.
Column 37, line 62(claim 17): "bead comprising" should read --head comprising--.
Column 38, line 6(claim 17): "anisotrovic" should read --anisotropic--.
Column 40, line 28(claim 27): "arc" should read --are--.
Column 40, line 35(claim 28): "optical bead" should read --optical head--.
Column 41, line 2(claim 31): "clement" should read --element--.

Signed and Sealed this

Twenty-sixth Day of June, 2007

JON W. DUDAS
*Director of the United States Patent and Trademark Office*